(12) United States Patent
Dubeyko et al.

(10) Patent No.: US 12,287,986 B2
(45) Date of Patent: Apr. 29, 2025

(54) SYSTEM FOR COMPUTATIONAL STORAGE WITH HARDWARE-ASSISTANCE

(71) Applicant: Lemon Inc., Grand Cayman (KY)

(72) Inventors: Viacheslav Dubeyko, Los Angeles, CA (US); Jian Wang, Beijing (CN)

(73) Assignee: LEMON INC., Grand Cayman (KY)

( * ) Notice: Subject to any disclaimer, the term of this patent is extended or adjusted under 35 U.S.C. 154(b) by 109 days.

(21) Appl. No.: 17/746,831

(22) Filed: May 17, 2022

(65) Prior Publication Data

US 2023/0376242 A1    Nov. 23, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ...... G06F 3/0604; G06F 3/061; G06F 3/0616; G06F 3/0658; G06F 3/0659; G06F 3/0679

See application file for complete search history.

(56) References Cited

U.S. PATENT DOCUMENTS

| | | | |
|---|---|---|---|
| 10,891,076 B1* | 1/2021 | Haig | G06F 3/0683 |
| 11,205,476 B1* | 12/2021 | Haig | G11C 7/1006 |
| 2018/0253423 A1* | 9/2018 | Hack | G06F 16/14 |
| 2022/0206715 A1* | 6/2022 | Kim | G06F 3/0656 |
| 2022/0236902 A1* | 7/2022 | Pinto | G06F 3/0644 |
| 2022/0291861 A1* | 9/2022 | Malakapalli | G06F 3/0679 |

\* cited by examiner

*Primary Examiner* — Aracelis Ruiz
(74) *Attorney, Agent, or Firm* — Faegre Drinker Biddle & Reath LLP

(57) ABSTRACT

A system includes a first hardware architecture and computational storage. The computational storage includes a second hardware architecture, and memory storing instructions that, when executed by the second hardware architecture, causes the system to perform a first set of operations. The first set of operations include receiving instructions from the first hardware architecture, performing one or more computations on data stored in the second hardware architecture, based on the received instructions, and transmitting a result to the first hardware architecture, based on the one or more performed computations.

16 Claims, 20 Drawing Sheets

SYSTEM FOR COMPUTATIONAL STORAGE WITH HARDWARE-ASSISTANCE

BACKGROUND

A majority of computer readable instructions that are executed by a computing device are operations that move data. Therefore, a majority of power consumption is spent not on performing relevant computations, but rather, on moving data between a processing core and memory of the computing device. Such inefficiencies reduce performance of metadata and user data operations and can shorten the lifetime of computing device memory on which a relatively high amount of read and write instructions are being performed.

It is with respect to these and other general considerations that aspects of the present disclosure have been described. Also, although relatively specific problems have been discussed, it should be understood that the embodiments should not be limited to solving the specific problems identified in the background.

SUMMARY

Aspects of the present disclosure relate to methods, system, and media for computational storage using a hardware-assisted file system.

In some aspects of the present disclosure a system is provided. The system includes a first hardware architecture and computational storage. The computational storage includes a second hardware architecture, and memory storing instructions that, when executed by the second hardware architecture, causes the system to perform a first set of operations. The first set of operations include receiving instructions from the first hardware architecture, performing one or more computations on data stored in the second hardware architecture, based on the received instructions, and transmitting a result to the first hardware architecture, based on the one or more performed computations.

In some aspects of the present disclosure a method of reading data from computational storage is provided. The method includes receiving data, from one or more journals, via one or more cores of a first hardware architecture. The received data corresponds to journal transactions. The method further includes performing one or more computations, within the first hardware architecture. The method further includes transmitting information, corresponding to the received data and the one or more performed computations, to a second hardware architecture. The method further includes receiving the information within one or more threads being executed on the second hardware architecture. The one or more journals are stored in persistent memory of the first hardware architecture. The memory includes a plurality of NAND flash die that each include one or more partitioned zones.

In some aspects of the present disclosure a method of performing a computation on a computational storage is provided. The method includes receiving instructions at one or more cores of a hardware architecture. The method further includes performing, via the one or more cores, one or more computations to manipulate data within memory of the hardware architecture. The one or more computations are based on the received instructions. The memory includes a plurality of NAND flash die that each include one or more partitioned zones.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGS.

DETAILED DESCRIPTION

Figure 1:
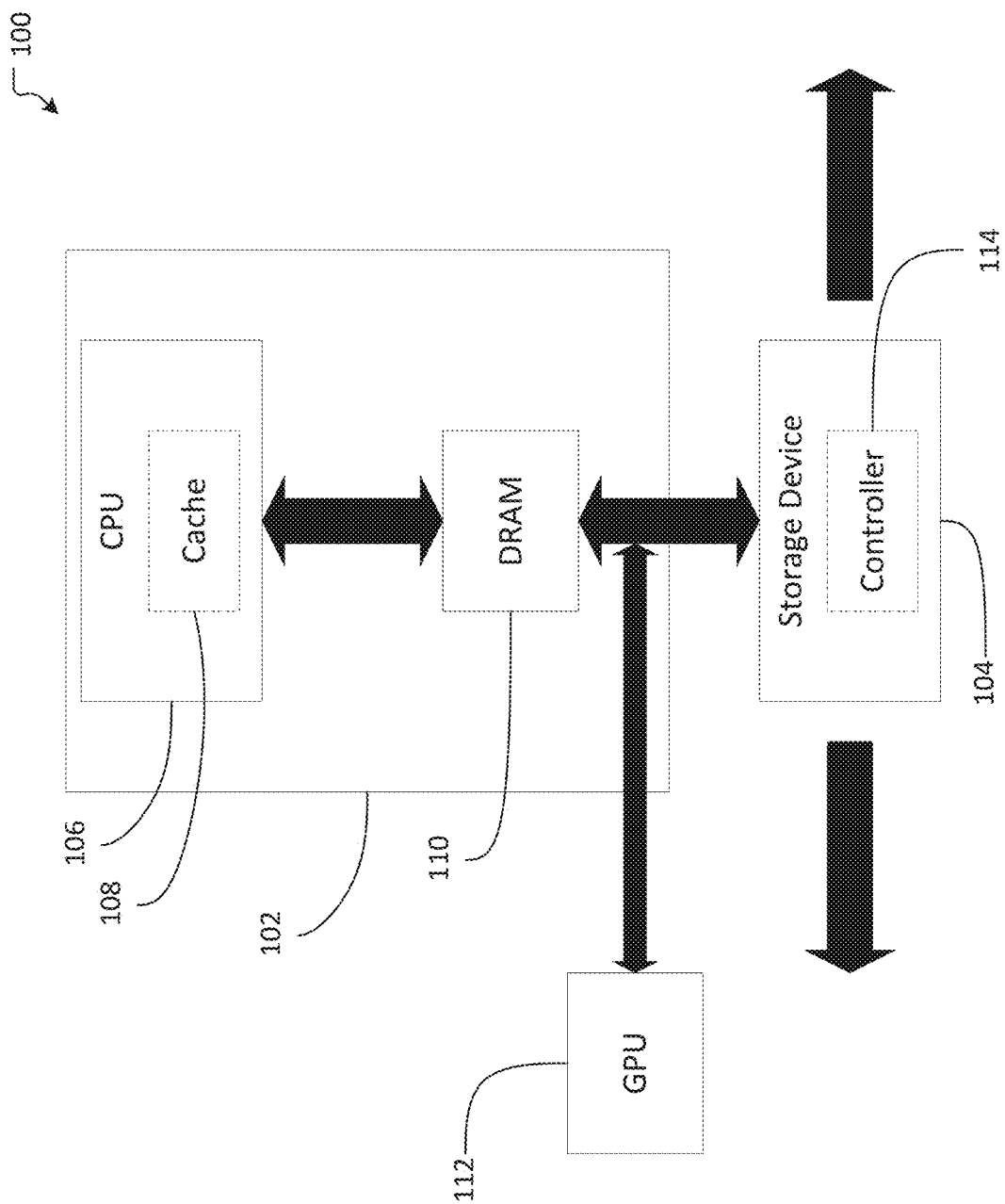
FIG. 1 illustrates an overview of a conventional system without computational storage.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various examples illustrating aspects of the present disclosure are described herein. Across examples, components may be described with similar names (e.g., journal, core, zone, NAND die or die, volume, file system, etc.). It should be recognized that components with similar names, and described in different examples, may be capable of performing similar functions or interacting with other components in similar manners. Alternatively, in some examples, components with similar names, and described in different examples, may be capable of performing different functions or interacting with different components than the earlier/later described components with the similar names.

As mentioned above, a majority of computer readable instructions that are executed by a computing device are operations that move data. Therefore, a majority of power consumption of a computing device is spent not on performing relevant computations, but rather on moving data between a processing core and memory of the computing device. Such inefficiencies reduce performance of metadata and user data operations and can shorten the lifetime of computing device memory on which a relatively high amount of read and write instructions are being performed.

The rise of big data sets in industry and the need for larger memory volumes in computing technology applications have created inefficiencies in data processing that are time-consuming and power consuming. Generally speaking, 80% of machine instructions are operations that move data from one location to another location. Therefore, the majority of power consumption in a data processing system is spent not on relevant computations, but rather on moving data and/or instructions between a processing core and memory.

Central processing unit (CPU) caches may improve data processing performance, but as a side effect, the caches need to employ complicated cache coherence protocols to achieve a consistent view of data in memory, using cores of the central processing unit. Further, CPU caches may be built on static random-access memory (SRAM) that is relatively fast, but also consumes a relatively large quantity of power. DRAM can also consume a relatively large quantity of power (e.g., since cells of DRAM are refreshed every 64 to 32 milliseconds to keep data). So, increasing a capacity of DRAM or CPU cache size can result in an increase in power consumption. On the other hand, persistent memory does not need to refresh memory cells and is therefore much more power-efficient. Some computing systems require moving data from persistent storage into dynamic random-access memory (DRAM) with the goal to access and process data by CPU cores. Persistent memory technologies continue to become faster for computations; however, modern computing systems negate the advantages being made in persistent memory technologies because of known drawbacks.

File storage systems may contain information that is stored in persistent memory. To perform actions that are based on the information stored in persistent memory, the information has to be retrieved from the persistent memory (e.g., a read operation needs to be performed), then some function may be executed based on the retrieved information, and then some result will be returned. Using conventional implementations, excess data moving operations are performed on a host side.

Aspects of the present disclosure address the above-mentioned deficiencies, in addition to further benefits which may be recognized by those of ordinary skill in the art. For example, using systems and mechanisms described herein, data processing can be offloaded from a host device to a storage device (e.g., a computational storage device). Accordingly, data and metadata can be processed in persistent memory space, without depleting computational resources of the host device. Generally, methods and systems disclosed herein provide powerful techniques to offload data processing onto a computational storage device that interacts with a host device.

More specifically, FPGA core(s) may retrieve data, execute a computation or function, and return results of the computation or function, all inside of the same device (e.g., a computational storage device). Some advantages may be that: (1) data moving operation on a host side are excluded, (2) data processing inside of computation storage can be executed by multiple FPGA cores in parallel, and (3) results of operation, such as computational operations, can be stored into persistent memory by a computational storage device itself. All of these points improve performance because a host device does not spend resources on data moving operations.

FIG. 1 illustrates an overview of a conventional system 100 without computational storage. The system 100 include a host device 102 and a storage device 104 (e.g., a solid-state drive (SSD) or a hard disk drive (HDD)). The host device 102 may be coupled to, or otherwise in communication with, the storage device 104. The host device 102 includes a processor 106 (e.g., a central processing unit (CPU)). The processor 106 may include a cache 108. The cache 108 may store a local copy of data that is used by the processor 106 for executing functions for host device 102. The host device 102 further includes memory 110 (e.g., dynamic random-access memory (DRAM)). The processor 116 may be coupled to and/or in communication with the memory 110 to execute read and/or write instructions for data operations. The host device 102 may further be in communication with and/or include a graphical processing unit (GPU) 112. The graphical processing unit 112 may also be coupled to and/or in communication with the memory 110 to execute read and/or write instructions for data operations. The storage device 104 further includes a controller 114.

A controller, as described with respect to conventional systems discussed herein, refers to a system that may include a component, such as an application-specific integrated circuit (ASIC), that manages read and/or write operations using input-output (I/O) systems. The combination of a controller and persistent memory, as discussed with respect to FIG. 1, differs from computational storage devices discussed below, at least because a computational storage device utilizes a computational component to perform computations, or other processing, on data that is already stored in the computational storage device. That is, the computational storage device can receive instructions to process, or perform computations, on the data in the computational storage device that is already stored at the computational storage device. As an example, one or more instructions may be sent to the computational storage device to execute some computation inside of computational storage device on data that is already stored at the computational storage device. Such data may be stored or provided to the computational storage device by means of standard I/O operations from a host or controller; however, the computational storage device is configured to receive one or more instructions, from the host for example, and perform a computation on the data, where the computation goes beyond accessing, moving, or storing the data. For example, the computational storage device may perform computations, including but not limited to Boolean computations, arithmetic computations, logical computations, interference computations, etc. Alternatively, or in addition, if data is stored at the host side then, such computations may be performed at the host side. However, if the data is already stored in the computation storage, then from a computation and efficiency perspective, it makes sense to offload the computation by performing the computations via the computational storage device. In examples, a computational storage device may include a field programmable gate array (FPGA) to perform such computations.

Aspects of the system 100 may exemplify common issues that are faced using conventional data storage methods. For example, caches (e.g., cache 108) may experience cache coherence problems where data that is stored across multiple local caches are not properly synchronized as the processor 106 updates local copies of data (e.g., after performing read and/or write instructions). Further, memory (e.g., memory 110) may face a memory wall problem, such as occurs when the rate of improvement of processor performance far exceeds the rate of improvement in DRAM memory speed. Memory wall problems can be a performance bottleneck in systems operations. The system 100 may experience a throughput bottleneck as data is transferred between the host device 102 to the storage device 104. A throughput bottleneck can limit productivity and efficiency of the system 100.

System 100 may further experience data moving problems when transmitting data between the host device 102 (e.g., from memory 110) and the GPU 112. For example, transmitting data between the host device and GPU 112 may create a power consumption problem where the GPU demands a relatively large or undesirable amount of power from system 100 to receive, and/or perform operations using, data from the host device 102. Excessive data movement can reduce the lifetime of hardware components that store data (e.g., an SSD or HDD), in addition to reducing the efficiency of a system in which the data movement is occurring (e.g., system 100). Therefore, it may be beneficial to implement systems and methods in which data movement is reduced to perform desired actions or computations.

System 100 may further experience excess controller overhead at controller 114 when the controller is used to manage a relatively large amount of data operations. Generally, the storage device 104 may experience big data problems, in which relatively large amounts of data and/or metadata are stored on the storage device 104. Conventional storage devices lack computational capabilities. Therefore, computations cannot be offloaded to the conventional storage devices. Accordingly, mechanisms disclosed herein that allow computations to be offloaded into a storage device are beneficial.

Figure 2:
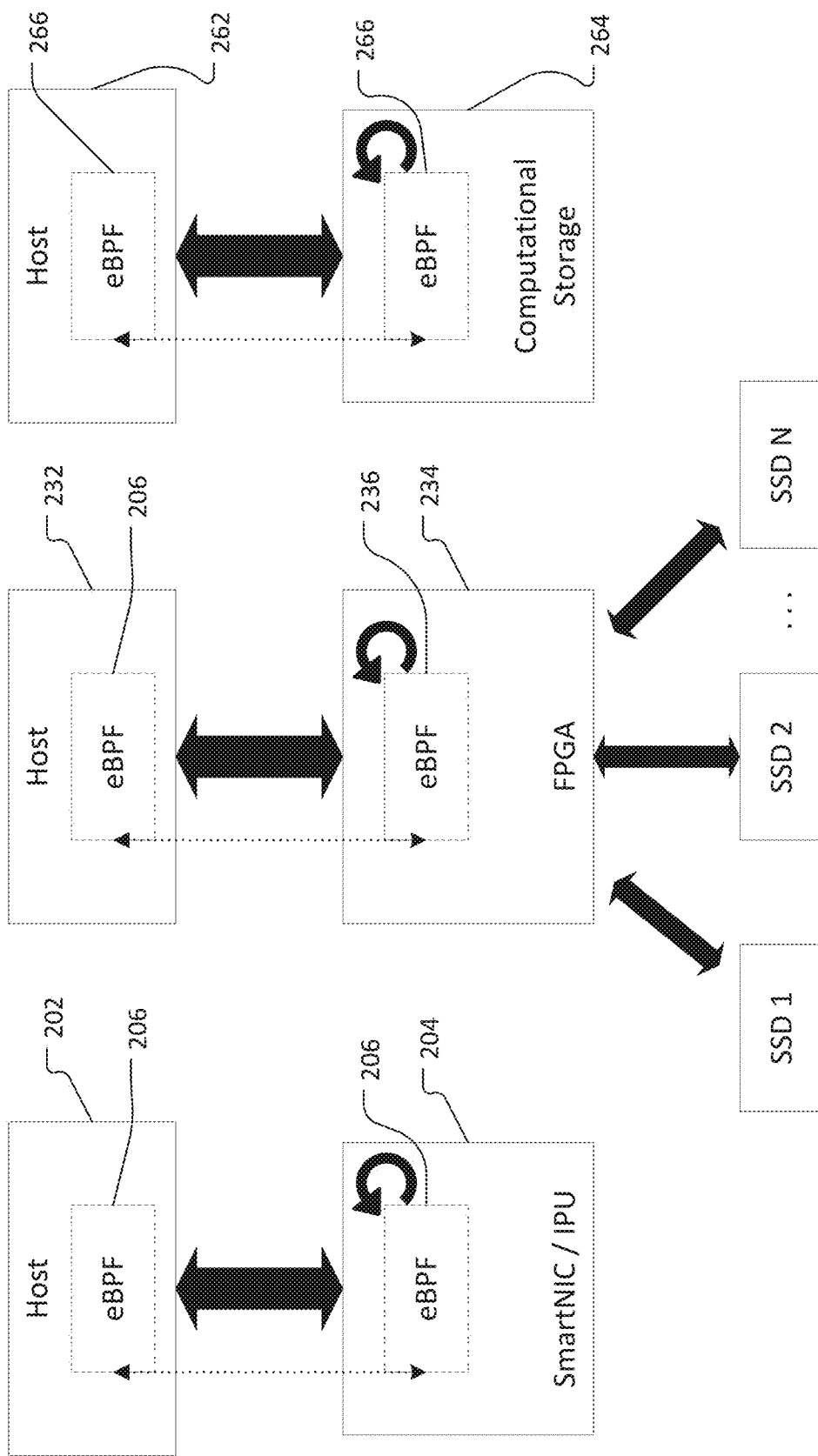
FIG. 2A illustrates an example system for computational storage with hardware assistance according to some aspects described herein.
FIG. 2B illustrates an example system for computational storage with hardware assistance according to some aspects described herein.
FIG. 2C illustrates an example system for computational storage with hardware assistance according to some aspects described herein.

FIGS. 2A-2C illustrate example systems for computational storage with hardware assistance according to some aspects described herein. In some examples, the storage device can be implemented as a storage device with embedded computation (e.g., a smart solid-state drive (SmartSSD), a smart network interface card (smartNIC), an intelligent processing unit (IPU), a specialized hardware accelerator, etc.). The responsibility of the host device may be to deliver an executable function to the storage side device (e.g., via an extended Berkeley packet filter (eBPF)) and initiate data processing to occur within the storage device (e.g., computational storage).

FIG. 2A illustrates an example system 200 for computational storage with hardware assistance. The system 200 includes a host device 202 and a first hardware architecture or hardware accelerator 204. In the example system 200, the hardware accelerator 204 is a programmable accelerator, such as a smartNIC, or an IPU. The first hardware architecture 204 can include a computational storage device, such as computational storage device 234, and/or 264 discussed further below. For example, the first hardware architecture 204 can include a storage component, such as one or more solid-state drives (SSDs). Further, the first hardware architecture 204 can include a computational component, such as a field programmable gate array (FPGA). The storage component and computational component may form the computational storage device on the first hardware architecture 204.

The first hardware architecture 204 may be configured to receive network packets. The first hardware architecture 204 can include a kernel or kernel-space, and one or more eBPF subsystem(s) 206 that are configured to execute instructions within the kernel. Alternatively, the one or more eBPF subsystem(s) can be implemented on hardware only (e.g., hardware of the smartNIC or IPU). Further, the host device 202 can include a kernel or kernel-space, and one or more eBPF subsystem(s) 206 that are configured to execute instructions within the kernel. Additionally, or alternatively, the host device can include a user-space, and the one or more eBPF subsystem(s) can be configured to execute instructions within the user-space. One of ordinary skill in the art will recognize types of eBPF subsystem(s) that can be configured to be executed by the host device 202 or the first hardware architecture 204.

The first hardware architecture 204 may be configured to analyze and/or parse contents of network packets to determine results corresponding to the received network packets. For example, the host 202 may send network packets to the first hardware architecture 204, and the first hardware architecture 204 (e.g., a SmartNIC) may send the network packets to another host. Alternatively, the first hardware architecture (e.g., a SmartNIC) 204 may receive the network packets from another host, analyze the networks packets, and deliver a result of the analysis to the host 202. The first hardware architecture 204 may further be configured to process data corresponding to the determined results, and store results into non-volatile memory or persistent memory (e.g., flash memory). In this regard, data processing may be offloaded from the host device 202 to the first hardware architecture 204.

FIG. 2B illustrates an example system 230 for computational storage with hardware assistance. The system 230 includes a host device 232 and a computational storage device 234 (e.g., a combination of a hardware accelerator and one or more storage devices). In the example system 230, the computational storage device 234 is an integrated circuit, such as a field programmable gate array (FPGA) that includes one or more solid state drives (SSD). For example, the FPGA may be coupled to the one or more solid state drives (SSD). The computational storage device 234 may be configured to receive network packets. The computational storage device 234 can include a kernel or kernel-space, and one or more eBPF subsystem(s) 236 that are configured to execute instructions within the kernel. Alternatively, the one or more eBPF subsystem(s) can be implemented on hardware only (e.g., hardware of the FPGA). Further, the host device 232 can include a kernel or kernel-space, and one or more eBPF subsystem(s) 206 that are configured to execute instructions within the kernel. Additionally, or alternatively, the host device can include a user-space, and the one or more eBPF subsystem(s) can be configured to execute instructions within the user-space. One of ordinary skill in the art will recognize types of eBPF subsystem(s) that can be configured to be executed by the host device 232 or the computational storage device 234.

The computational storage device 234 may be configured to analyze instructions (e.g., received from the host device 232) to determine functions or computations corresponding to the received instructions. The computational storage device 234 may further be configured to process data corresponding to the determined results, and store results into non-volatile memory or persistent memory (e.g., flash memory). In this regard, data processing may be offset from the host device 232 to the computational storage device 234.

FIG. 2C illustrates an example system 260 for computational storage with hardware assistance. The system 260 includes a host device 262 and a storage device 264. In the example system 260, the storage device 264 is a computational storage device. The storage device 264 may be configured to receive instructions. The storage device 264 can include a kernel or kernel-space, and one or more eBPF subsystem(s) 266 that are configured to run within the kernel. Alternatively, the one or more eBPF subsystem(s) can be implemented on hardware only (e.g., hardware of the computational storage device 264). Further, the host device 262 can include a kernel or kernel-space, and one or more eBPF subsystem(s) 206 that are configured to execute instructions within the kernel. Additionally, or alternatively, the host device can include a user-space, and the one or more eBPF subsystem(s) can be configured to execute instructions within the user-space. One of ordinary skill in the art will recognize types of eBPF subsystem(s) that can be configured to be executed by the host device 262 or the storage device 264.

The storage device 264 may be configured to analyze instructions (e.g., received from the host device 262) to determine functions or computations corresponding to the received instructions. The storage device 264 may further be configured to process data corresponding to the determined results, and store results into non-volatile memory or persistent memory (e.g., flash memory). In this regard, data processing may be offloaded from the host device 262 to the storage device 264.

Figure 3:
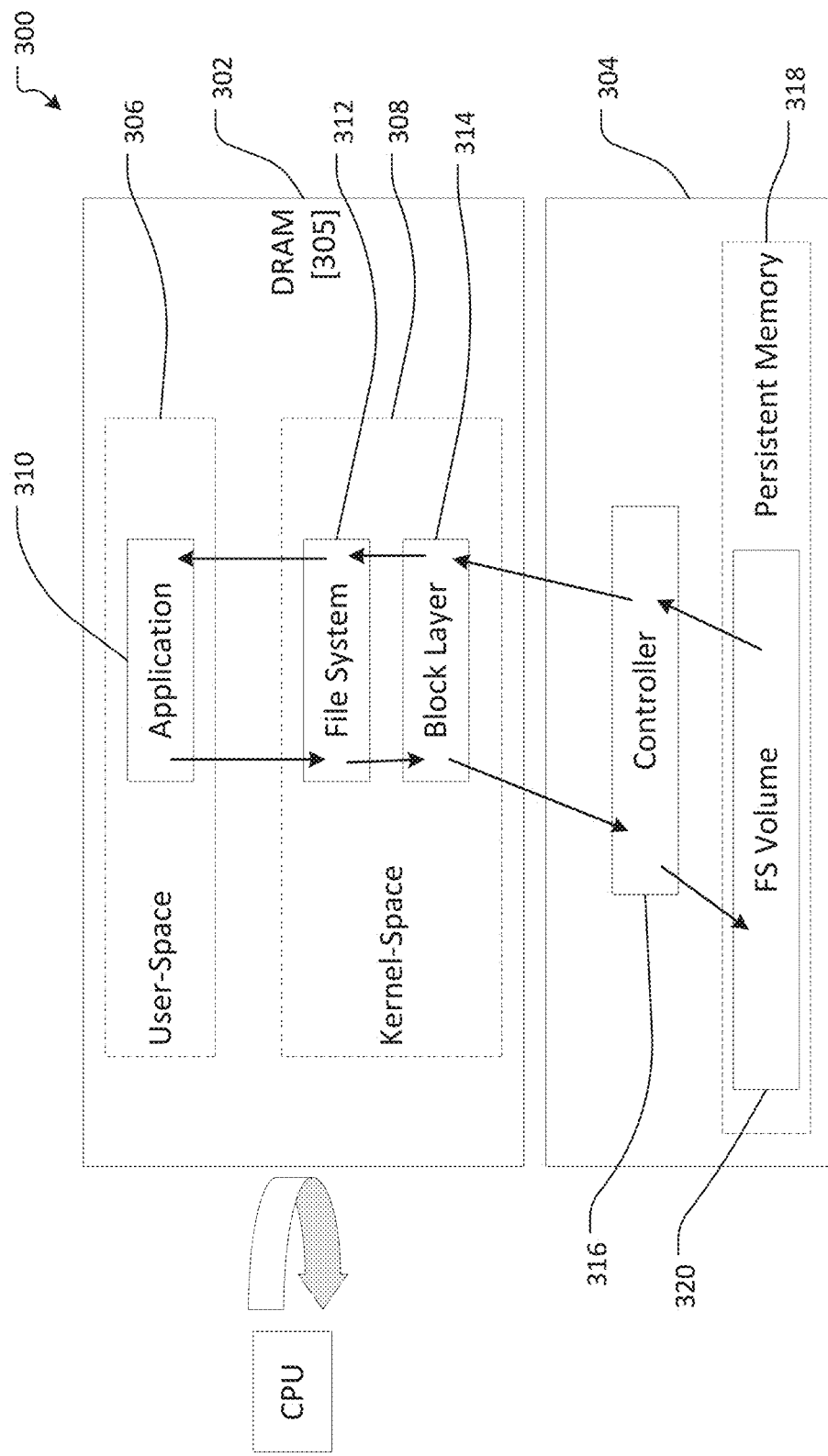
FIG. 3 illustrates an example system for computational storage with hardware assistance according to some aspects described herein.

FIG. 3 illustrates an example system 300 for computational storage with hardware assistance according to some aspects described herein. The system 300 includes a host device 302 and a computational storage device or storage device 304. The host device 302 may include dynamic random-access memory (DRAM) 305. The host device 302 may further include a user-space 306 and a kernel-space 308. The user-space 306 correspond to segments of memory that are designated to store computer readable instructions corresponding to user-space related functions. For example, the user-space 306 may include an application 310. The application 310 may be a word processing application, a graphics application, a computational application, a modelling application, or any other type of application recognized by those of ordinary skill in the art.

Similar to the user-space 306, the kernel-space 308 corresponds to segments of memory that are designated to store computer readable instructions corresponding to kernel-space related functions that may be recognized by those of ordinary skill in the art. The kernel-space 308 may include a file system 312 and a block layer 314. The file system 312 may receive data from the application 310, and the application 310 may transmit data to the file system 312 (via a processor), or vice-versa. The block layer 314 may receive data from file system 312 (via a processor), or vice-versa. The block layer 314 may then transfer or transmit data to the storage device 304, or vice-versa.

The storage device 304 includes a computational component, such as but not limited to a field programmable gate array (FPGA) 316 and persistent memory 318. The host device 302 may store data (e.g., user data and/or metadata) in the storage device 304 (e.g., in the persistent memory 318), for example, via an ASIC controller. The FPGA 316 may interact with the persistent memory 318 (e.g., via read and/or write instructions) to perform functions or computations (e.g., Boolean computations, arithmetic computations, logical computations, interference computations, etc.), such as functions or computations designated by the kernel-space 308. The persistent memory 318 may include a file system (FS) volume or volume 320. The file system volume 320 may store user data and/or metadata related to the file system 312 and/or the application 310.

Generally, file systems provide a way to manage and access data for applications. A file system is a mediator between applications and storage devices. File systems may contain metadata, that is usually unseen by an application, on a file system volume. Information that an application is trying to read or write can be user data. In some instances, user data can contain metadata from an application, that a user can see and modify. The file system 312, in combination with other aspects of system 300 enhance a performance of processing metadata dramatically, relative to conventional file systems, by reducing the number of exchanges that occur between the file system 312 and the computational storage device 304.

The file system 312 may contain knowledge about metadata and user data that are stored in the storage device 304 (e.g., in the persistent memory 318 of the storage device 304). In this respect, the file system 312 can transfer a series of functions to be executed (e.g., compiled in a journal or other data structure) to the storage device 304 on which the functions are executed. Accordingly, the file system 312 can offload processing of metadata and user data onto the storage device 304 because the storage device 304 is a computational storage device (e.g., a storage device with hardware-assisted processing capabilities).

The file system 312 can perform a number of functions. The file system 312 can identify addresses in persistent memory (e.g., logical block addresses or LBAs) that need to be processed, for example that need to be processed for the application 310. The file system 312 can identify the type of data that is stored in the addresses in persistent memory (e.g., metadata, user data, Strings, Integers, etc.). Having knowledge regarding the type of data that is stored in persistent memory that is desired to be accessed can be useful in increasing performance of computational functions performed by a system, such as system 300. The application 310 can define what functions or algorithms need to be applied on a file. The file system 312 can identify LBAs that contain data corresponding to the file on which the functions or algorithms (as defined by the application 310) need to be applied. The application 310 can request an execution of the functions or algorithms for the file, and the file system 312 can transmit the functions, with a definition of relevant LBA ranges or sets of LBAs on the computational storage device 304. The host device 302 can retrieve the result of data processing from the storage device 304, based on the identifications made, or knowledge stored, by the file system 312.

Figure 4:
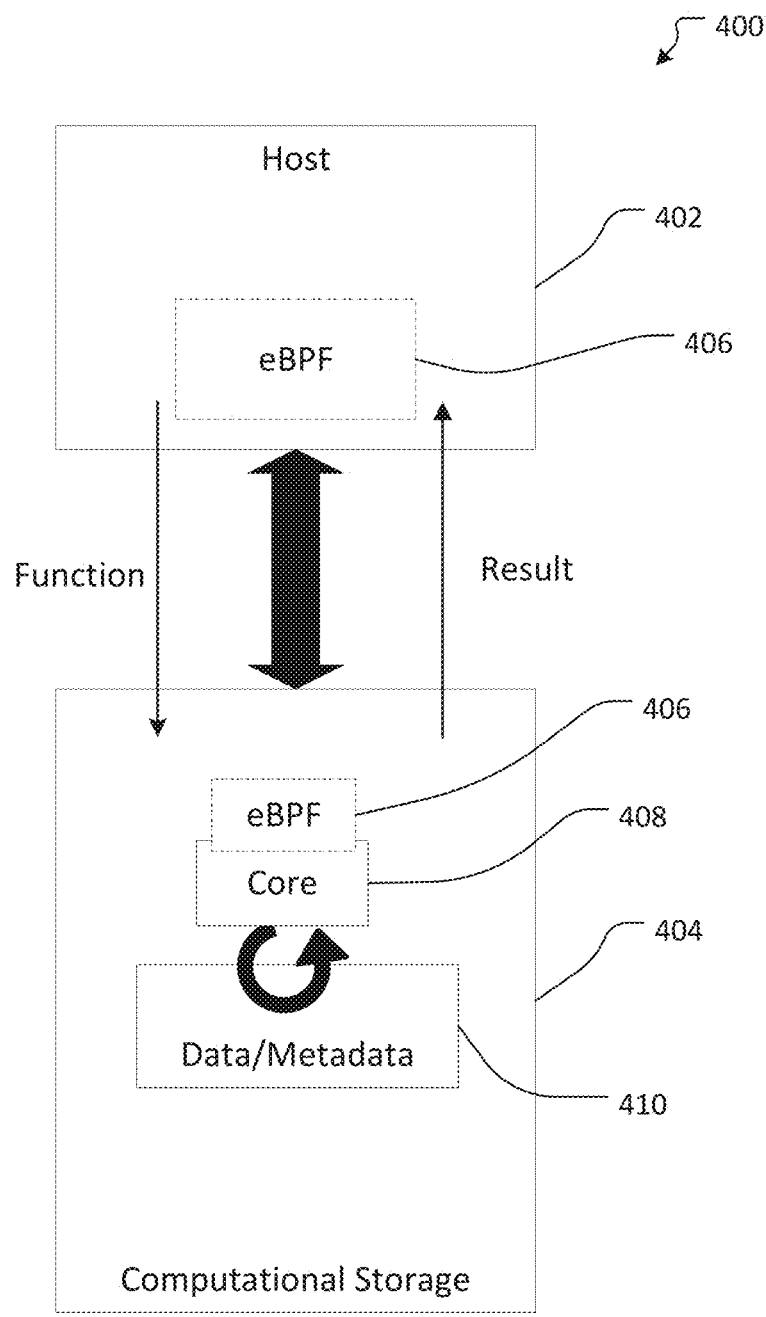
FIG. 4 illustrates an example system for computational storage with hardware assistance according to some aspects described herein.

FIG. 4 illustrates an example system 400 for computational storage with hardware assistance according to some aspects described herein. The system 400 may be similar to the system 300. For example, the system 400 includes a host device 402 and a computational storage device 404. The host device 402 includes a kernel-space or user-space with one or more eBPF subsystem(s) 406 that are configured to run therein. The host device 402 is coupled to, or otherwise in communication with the storage device 404.

The storage device 404 is a computational storage device. The computational storage device 404 can be the combination of various types of memory. For example the computational storage device can include one or more from the group of NAND flash, non-volatile memory (NVM), storage class memory (SCM), and dynamic random access memory (DRAM). The computational storage device can include a kernel with one or more eBPF subsystem(s) 406 that are configured to run therein. Alternatively, the computational storage device 404 can implement the eBPF subsystem(s) 406 on a hardware level. The computational storage device 404 can include one or more FPGA cores or cores 408 that are configured to execute instructions stored in memory. The computational storage device 404 can further include persistent memory that stores data and/or metadata 410 therein.

Generally, persistent memory is the main memory space in which a file system's metadata and user data is stored persistently. The computational storage device 404 can include dynamic random-access memory (DRAM) as temporary memory or non-volatile memory (NVM) to process I/O requests from the host device 402. In this respect, the computational storage device 404 can process metadata and user data to offload computational demands from the host device 402. The one or more cores 408 may be one or more cores of a field programmable gate array.

The one or more cores 408 can be configured or otherwise programmed to execute data processing within the computational storage device 404. For example, the one or more cores 408 may perform computations (e.g., Boolean functions, arithmetic computations, logical computations, interference computations, etc.), in addition or alternatively to read and/or write requests, on data/metadata 410. The one or more cores 408 can be programmed before data processing requests are received from the host device 402 (e.g., by way of the one or more sequences of instructions, such as eBPF functions). Alternatively, the one or more cores 408 can execute logic instructions (e.g., the eBPF functions) as part of the data processing requests transmitted from the host device 402. Generally, the host device 402 sends a data processing request to the storage device 404 that can include one or more functions to be performed. The storage device 404 performs the functions, such as by executing instructions, via the one or more cores 408, that interact with the data/metadata 410 (e.g., by performing computations, such as Boolean functions, arithmetic functions, logic functions, interference functions, etc.). Subsequently, a result of the performed functions is received by the host device 402, such as after being transmitted from the storage device 404 to the host device 402.

Figure 5:
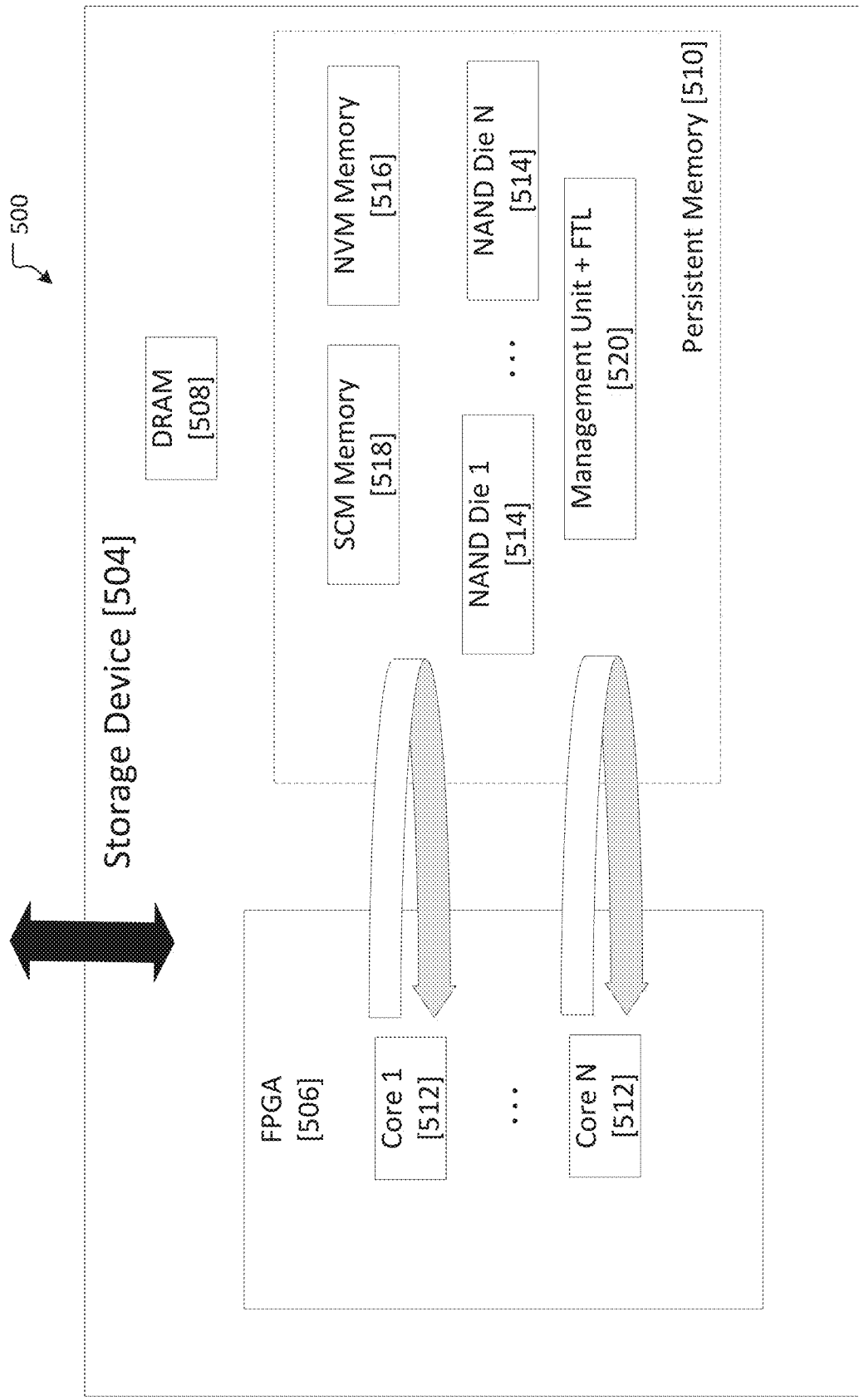
FIG. 5 illustrates an example system for computational storage with hardware assistance according to some aspects described herein.

FIG. 5 illustrates an example system 500 for computational storage with hardware assistance according to some aspects described herein. Specifically, FIG. 5 illustrates a computational storage device 504 that may be similar to the computational storage devices 304 and 404 discussed earlier herein. The storage device 504 includes a field programmable gate array (FPGA) 506, dynamic random-access memory (DRAM) 508, and persistent memory 510. Collectively, the FPGA 506, DRAM 508, and persistent memory 510 may form a hardware architecture. The FPGA 506 may include one or more cores 512. The one or more cores 512 may be similar to the core 408 discussed earlier herein with respect to FIG. 4.

The persistent memory 510 may include one or more NAND die 514. Additionally, or alternatively, the persistent memory 510 may include non-volatile memory (NVM) 516. Additionally, or alternatively, the persistent memory 510 may include storage class memory (SCM) 518. Additionally, or alternatively, the persistent memory 510 may include a management unit with a flash translation layer (FTL) 520. One of ordinary skill in the art will recognize that the storage device 504 may include other memory architectures that perform a similar function to the example persistent memory architectures disclosed herein.

Data and metadata similar to data and metadata 410 discussed with regard to FIG. 4 may be stored within the persistent memory 510. In this regard, the one or more cores 512 may receive data or metadata from the persistent memory 510 to perform computations or functions (e.g., Boolean computations, arithmetic computations, logical computations, interference computations, etc.). Additionally, or alternatively, the one or more cores 512 may input data or metadata into the persistent memory 510, either as the result of a computational process, or as an intermediary value in a computational process.

Figure 6:
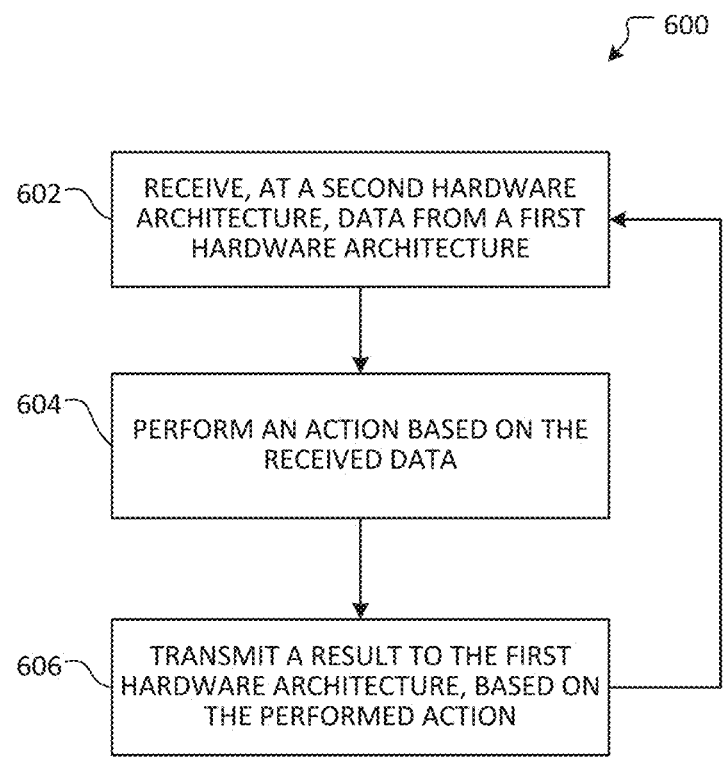
FIG. 6 illustrates an example method for performing actions, using computational storage with hardware assistance, according to some aspects described herein.

FIG. 6 illustrates an example method 600 for performing actions, using computational storage with hardware assistance, according to some aspects described herein. In examples, aspects of method 600 are performed by a system, such as system 200, 230, 260, 300, 400, or 500, discussed earlier herein with respect to FIGS. 2-5.

Method 600 begins at operation 602, wherein instructions from a first hardware architecture are received at a second hardware architecture. The instructions may be an execution request. Additionally, or alternatively, the instructions may be a special I/O request that can contain an executable function, such as, for example, an eBPF function. The first hardware architecture may correspond to one or more aspects of a host device, and data from the host device (e.g., the host device of systems 200, 230, 260, 300, 400, or 500) may be transmitted to a second hardware architecture. The first hardware architecture can include one of a field programmable gate array (FPGA), an infrastructure processing unit (IPU), a central processing unit (CPU), and a graphics processing unit (GPU).

The second hardware architecture may correspond to one or more aspects of a storage device (e.g., the computational storage device of systems 200, 230, 260, 300, 400, or 500). The second hardware architecture can include one of a field programmable gate array (FPGA), an infrastructure processing unit (IPU), a central processing unit (CPU), and a smart network interface controller (smartNIC). The second hardware architecture can further include non-volatile memory or persistent memory (e.g., flash memory) with instructions stored therein. The second hardware architecture can further include a plurality of cores.

Flow progresses to operation 604, wherein one or more computations are performed based on the received instructions. For example, the instructions may be received via memory in the second hardware architecture. A processor device or one or more cores of the second hardware architecture may interact with the memory of the second hardware architecture to perform one or more computations (e.g., Boolean computations, arithmetic computations, logical computations, interference computations, etc.) based on the instructions that were received. For example, if a user is seeking to format data in a spreadsheet on a host device that includes a first hardware architecture, then the host device may send formatting instructions to a computational storage device that includes a second hardware architecture. The second hardware architecture may format data that is stored in memory (e.g., persistent memory), based on the formatting instructions received from the host device. In this respect, it will be recognized that the computational load has been offloaded onto the second hardware architecture, such that less computations are occurring on the first hardware architecture, and between the first and second hardware architecture, relative to conventional applications that may seek also seek to format data.

Flow progresses to operation 606, wherein a result is transmitted to the first hardware architecture, based on the performed action. For example, using the formatting data in a spreadsheet example from above, the second hardware architecture may transmit a data set that has been formatted, based on the formatting instructions from the first hardware architecture, back to the first hardware architecture (e.g., as a result of a read operation performed by a host device). Since the computational workload is offloaded onto the storage device or second hardware architecture, performance of data processing operations is enhanced. It is considered that if an amount of data in the spreadsheet is relatively small, then it may not make sense to offload computations onto a second hardware architecture (e.g., a computational storage device). However, in contexts where an amount of data is relatively large (e.g., terabytes of data stored in spreadsheets/databases), then offloading computations to a second hardware architecture (e.g., a computational storage device) may be favorable to avoid reading a relatively large amount of data in memory (e.g., dynamic random access memory) of a first hardware architecture (e.g., a host device).

Figure 7:
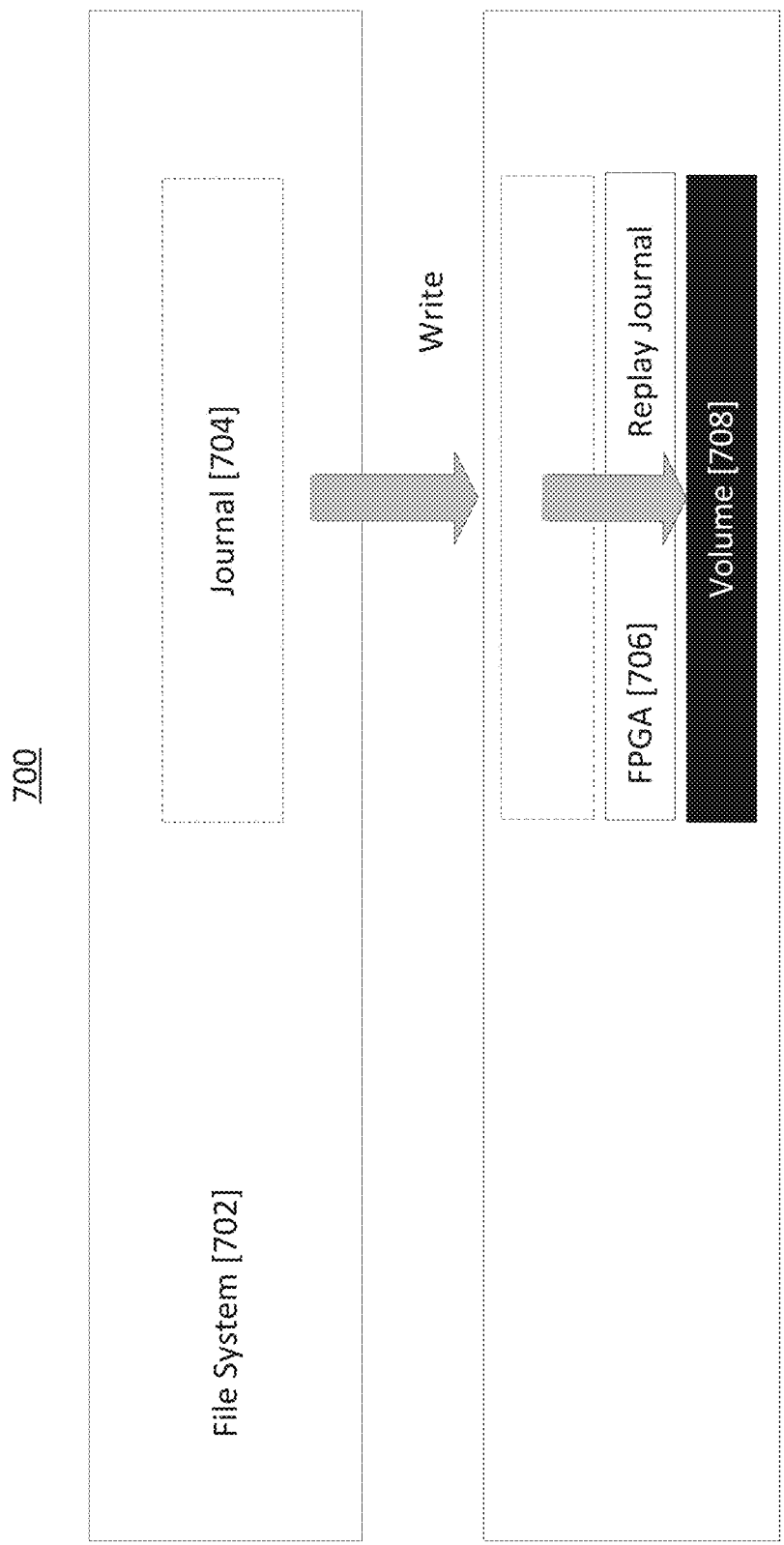
FIG. 7 illustrates a schematic diagram of journaling according to some aspects described herein.

FIG. 7 illustrates a schematic diagram 700 of journaling according to some aspects described herein. The schematic diagram 700 displays a file system 702 (e.g., a file system driver in a Linux kernel of a host device) and a computational storage device 703. The computational storage device 703 can include a journal 704, a field programmable gate array (FPGA) 706, and a file system volume or volume 708. The file system 702 can prepare transactions that are added into the queue of a journaling subsystem, such as a journaling subsystem for the journal 704. A journaling thread can write the prepared transactions of the journaling subsystem into special partitions or portions of the volume 708. The prepared transactions may be replayed from the journal 704 after specific events (e.g., failed transactions, system start-up, etc.), or after specific periods of time. The journal subsystem for the journal 704 can read transactions from the journal 704 and write transaction contents into requested physical sectors of memory, such as of the volume 708.

Generally, journaling is a file system technique that may be familiar to those of ordinary skill in the art. The goal of journaling techniques in data computation contexts may be to queue eBPF functions that can be executed by computational storage devices, such as any of the computational storage devices disclosed herein. In some examples, journals (such as journal 704) can be implemented as circular buffers that are used to keep a record of data transactions (e.g., data modifications to be performed by a core). Every data transaction may contain a record of a modification of one or more LBAs (e.g., LBAs on a file system volume, such as file system volume 520 or 708).

Data transactions such as creating metadata, user data, or other types of data may be stored in the journal 704. If a transaction fails (e.g., the transaction is broken or unable to be completed), then the transaction may be discarded from the journal 704. For example, the journal 704 may be replayed within the computational storage device 703, without replaying the discarded transaction. Replaying the journal 704 (e.g., via commands executed by the FPGA 706) can include re-executing transactions from the journal 704 to create the actual state of the file system volume 708, based on events that occur within the computational storage device 703.

Generally, journaling techniques are a flash-friendly approach to executing data operations. For example, when a journal (e.g., journal 704) is a circular buffer, there is no update of information in the journal. As a result, journaling techniques incorporated with aspects disclosed herein prolong a lifetime of persistent memory. The journal replay operation discussed above may be implemented by the FPGA 706. Specifically, the journal replay operations may be executed by one or more cores of the FPGA 706 (such as the one or more cores 512 discussed earlier herein with respect to FPGA 506). In conventional systems, journal replay operations may be executed by a host device; however, according to aspects of the present disclosure, journal replay operations can be easily offloaded into the computational storage device 404, thereby freeing up computational resources (e.g., CPU, GPU, etc.) on the host device.

The file system 702 may prepare transactions in the journal 704 within memory of the file system 702 (e.g., DRAM). For example, the file system 702 can prepare one or more 4K pages that each contain one or more journal transactions. After the journal 704 is prepared by the file system 702, the journal 704 may be transmitted to the computational storage device 703. Data manipulations and computations based on the journal 704 may then be executed on the computational storage device 703. For example, journal content (e.g., transactions) may be read by the FPGA 706 to perform data manipulation or computations. For example, the FPGA 706 may perform one or more read commands to execute functions or computations based on transactions in a section of the volume 708 that correspond to the journal 704. Generally, methods and systems disclosed herein provide powerful techniques to offload data processing onto a computational storage device (e.g., computational storage device 703) that interacts with a host device (e.g., file system 702).

Figure 8:
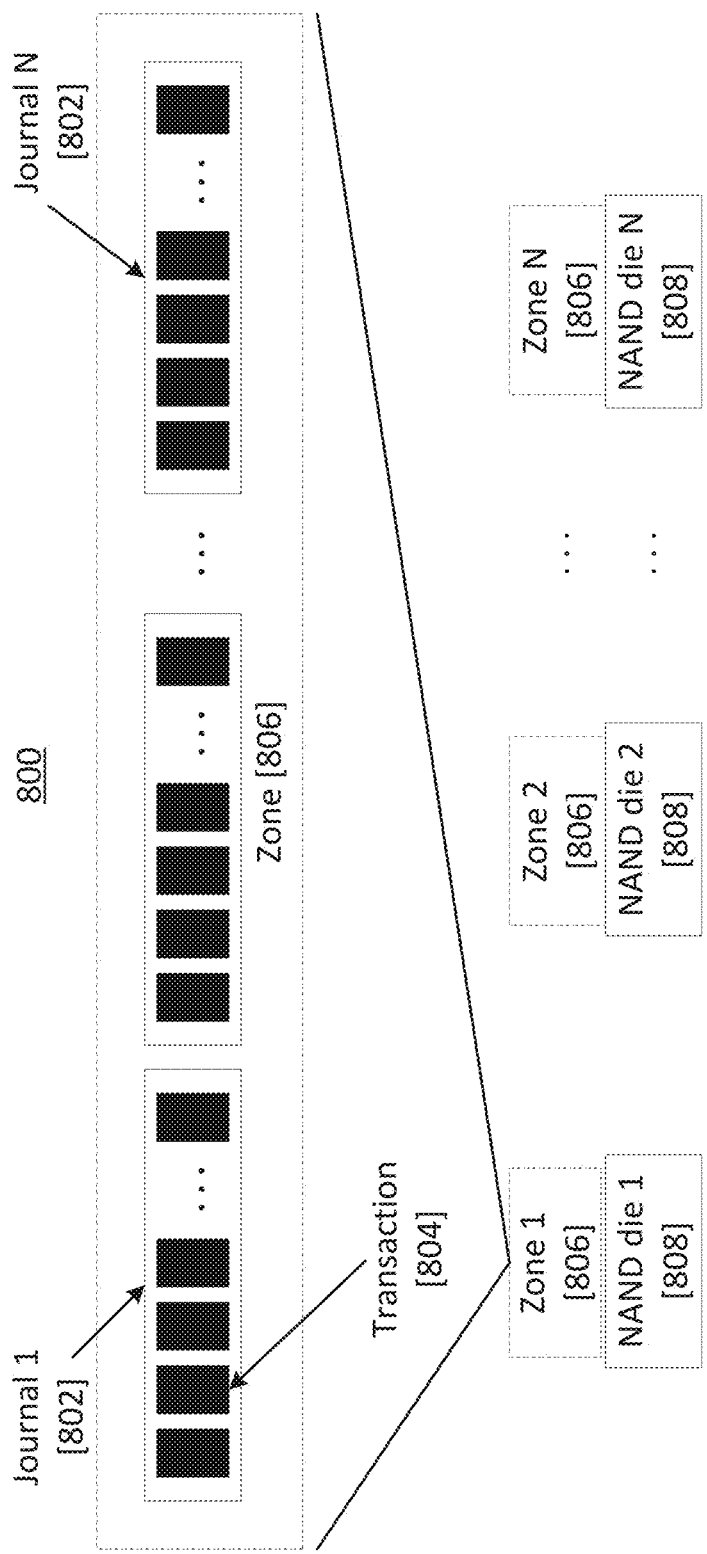
FIG. 8 illustrates a schematic diagram of a journal write path, using computational storage with hardware assistance, according to some aspects described herein.
Figure 9:
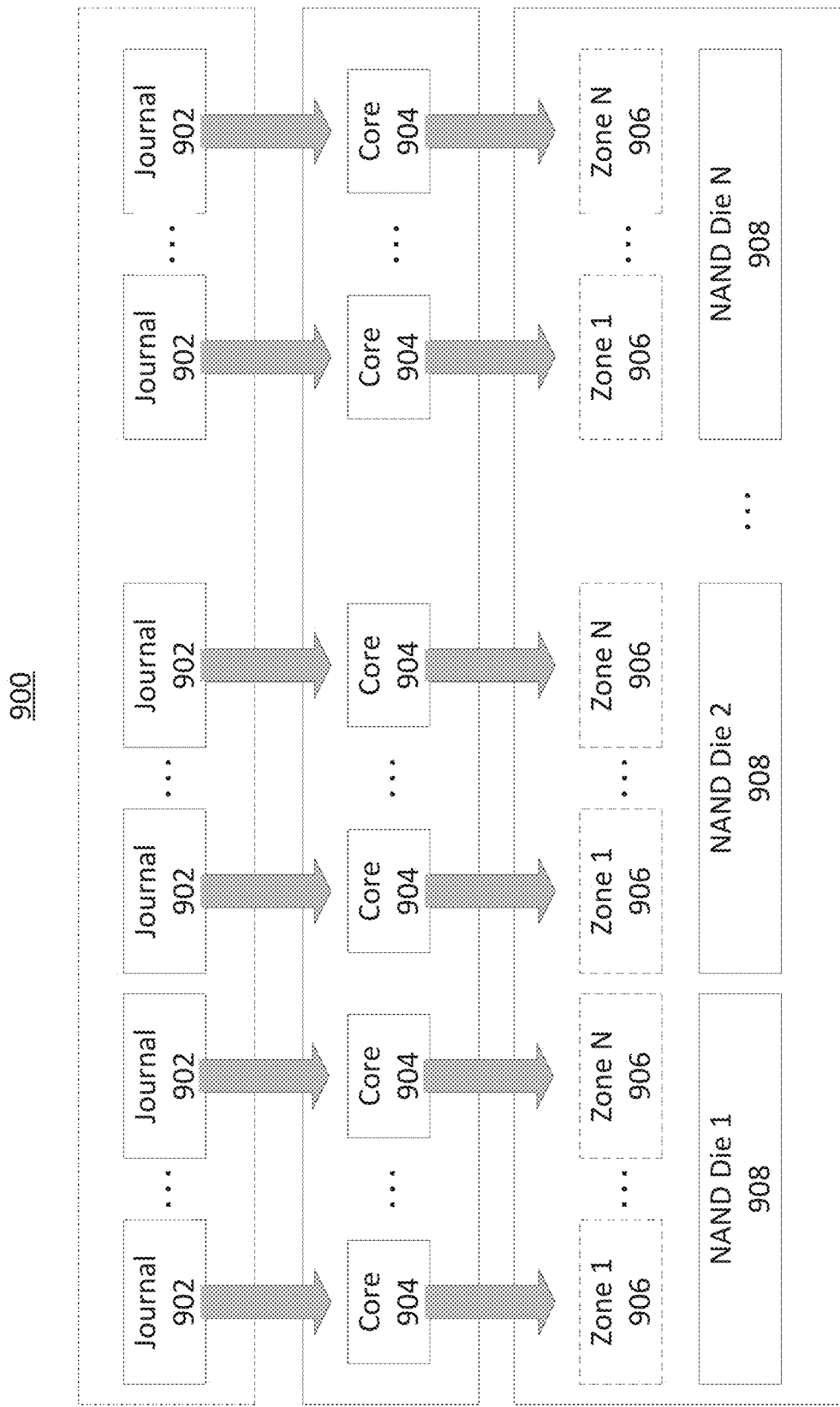
FIG. 9 illustrates a schematic diagram of a journal write path, using computational storage with hardware assistance, according to some aspects described herein.

FIGS. 8 and 9 illustrate schematic diagrams 800 and 900, respectively, of journal write paths, using computational storage with hardware assistance, according to some aspects described herein. Storage devices can contain various types of memory which may be recognized by those of ordinary skill in the art. One such type of memory may be NAND flash. Any type of memory may be represented by a set of chips. NAND flash, specifically, may be represented by NAND dies. Every NAND die is an independent chip that is capable of executing operations independently (e.g., read operations, write operations, erase operations, etc.). NAND die can contain one or more zones, and the one or more zones can be processed in a parallel manner (e.g., by one or more cores of a processing device). As a result, each zone that corresponds to one more NAND die can correspond to one or more journals. Further, in some examples, NAND die can include a plurality of zones, wherein one or more of the plurality of zones can correspond to one or more journals.

File system volume can include a plurality of zones. A volume (e.g., volume 708) can be created by selecting a sequence of zones from the plurality of zones. Each zone can correspond to its own respective journal. Alternatively, each zone can correspond to a plurality of respective journals. File systems can manage a plurality of journals that can each be managed by an independent NAND dies and FPGA core, thereby allowing for systems disclosed herein to perform computations, based on journal transactions, in a parallel manner.

Applications (e.g., application 310) can have one or more threads that can each interact with different parts of a file system volume (e.g., volume 320). File systems may need to store transactions in different journals that can be read by multiple FPGA cores of computational storage to perform computations based thereon. Aspects of the present disclosure, as shown in FIGS. 8 and 9, provide examples of computational storage devices with hardware assistance to implement such journal write paths that enable parallel processing.

Referring specifically to the schematic diagram 800, a one or more journals 802 are disclosed. The one or more journals 802 may comprise a plurality of journals 802. The plurality of journals 802 each contain one or more transactions 804. The transactions 804 may be stored inside of LBAs of a first part of memory. The transactions stored in the LBAs may contain information corresponding to LBAs of a second part of memory, that is different than the first part of memory in which the transactions are stored. The information contained within the transactions may correspond to functions that are desired to be performed by a file system (e.g., file system 702). The plurality of journals 802 each correspond to a zone 806 in memory. Systems disclosed herein may contain a plurality of zones 806 that each receive data from a corresponding one of the one or more journals 802 with the one or more transactions 804 stored therein. Each zone 806 can correspond to a NAND die 808. For example, each zone 806 can correspond to a respective segment (e.g., groups of LBAs) of the NAND die 808. In other examples, it should be recognized that the zones 808 can be stored on other types of memory that include chips or parts of memory (e.g., groups of LBAs), which each correspond to a different zone for performing parallel journaling operations disclosed herein.

Referring now to the schematic diagram 900, one or more journals are disclosed. The one or more journals 902 may comprise a plurality of journals 902. The plurality of journals 902 can each contain one or more transactions (see FIG. 8). The plurality of journals 902 can each correspond to one or more cores 904 (e.g., cores of a FPGA or other type of processing device). Each of the one or more cores 904 can correspond to one or more zones 906 that each correspond to one or more NAND die 908. Each NAND die 908 can comprise a plurality of zones 906.

As shown in FIG. 9, write operations may be performed using systems disclosed herein. Specifically, the core 904 may extract data (e.g., transactions) from the journal 902 to perform computations based thereon. The core 904 may manipulate data within its corresponding zone 906 of the respective NAND die 908 to perform the computations. Since there may be a plurality of journals 902, cores 904, zones 906, and NAND die 908, computations discussed herein can be performed in a parallel manner that allows data operations to be performed relatively quickly, since each of the plurality of cores 904 can processes I/O requests in independent queues directed to dedicated or corresponding zones 906.

Figure 10:
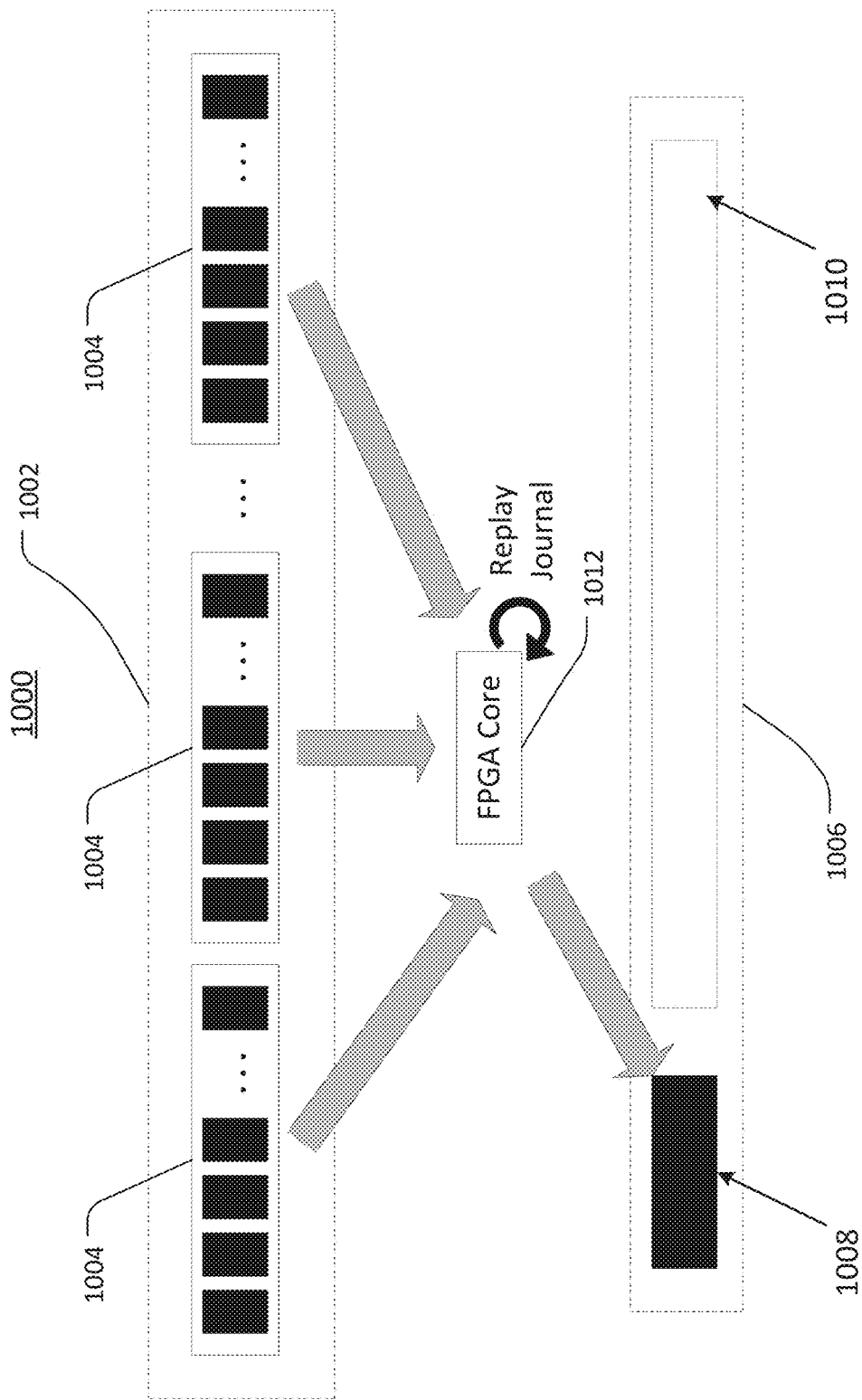
FIG. 10 illustrates a schematic diagram of a journal replay path, using computational storage with hardware assistance, according to some aspects described herein.

FIG. 10 illustrates a schematic diagram 1000 of a journal replay path, using computational storage with hardware assistance, according to some aspects described herein. Schematic diagram 1000 discloses a first zone 1002 that includes a plurality of journals 1004. The first zone 1002 may be found in a computational storage device, such as the computational storage device 404. Schematic diagram 1000 further discloses a second zone 1006 that includes a file system volume or volume or volume state 1008 and a journal space 1010. The second zone 1006 is also disposed in the computational storage device. Information from transactions may be extracted from the first zone 1002 by a core 1012 (e.g., a core of a FPGA). Core 1012 may perform a computation (e.g., a journal replay, Boolean computation, arithmetic computation, logical computation, interference computations, etc.) based on the extracted transaction information.

Computational storage, such as the computational storage devices disclosed herein, can use a variety of policies to perform journal replay operations. For example, the first zone 1002 may include the one or more journals 1004 and the second zone 1006 may be completely empty (e.g., volume 1008 is absent). The cores 1012 may replay the journals 1004 from the first zone 1002 and a prepared state of data will be added and/or stored as volume 1008. Empty space of the second zone 1006 can be used as space to store journal transactions. After the journals 1004 replay in the first zone 1002, the first zone 1002 can be re-initiated (e.g., made to be empty) and can be used to store user data and/or metadata of new journals (e.g., from the one or more journals 1004).

Another policy could be to delay journal replay operations until a read operation is being performed. Storing function in a journal is flash-friendly because a journal's contents may never need to be updated. Further, keeping content in a journal provides the opportunity to rollback to previous states of metadata or user data if a transaction prompts incorrect or malicious modifications of metadata or user data.

Figure 11:
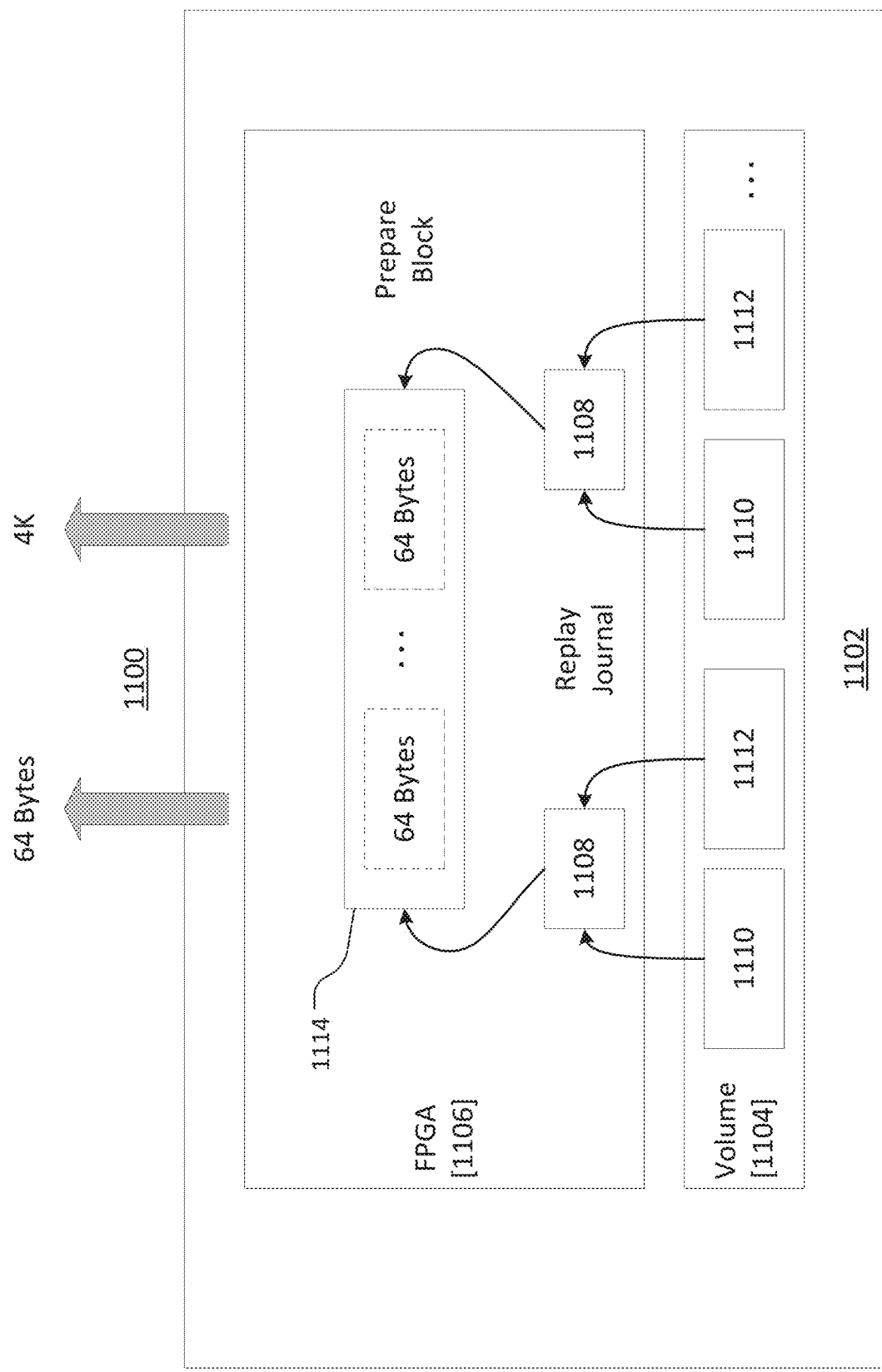
FIG. 11 illustrates a schematic diagram of a read path, using computational storage with hardware assistance, according to some aspects described herein.

FIG. 11 illustrates a schematic diagram 1100 of a read path, using computational storage with hardware assistance, according to some aspects described herein. The schematic diagram 1100 illustrates a computational storage device or storage device 1102. The storage device 1102 includes a volume 1104 and a FPGA 1106. The volume 1104 and the FPGA 1106 may collectively form a hardware architecture.

The storage device 1102 can implement memory semantics for a read path. Usually, exchanges between a host device and a storage device are based on 512 bytes or 4 kilobyte (4K) granularity. Therefore, if it is desired to read 64 bytes from an LBA, then an entire 4K physical sector needs to be sent to a host side. However, using mechanisms disclosed herein, it is possible to aggregate 64 byte portions from pages of one or more 4K blocks 1108 (e.g., such as blocks of data from the initial state 1110, and/or journal space 1112, and/or other aspects of memory) and to compact the 64 byte portions of the one or more 4K blocks 1108 into a 4K data aggregation or aggregated block 1114 that can be sent from the storage device 1102 to a host device. The host device can then place the aggregated 64 byte portions from the one or more 4K blocks 1108, which were aggregated into the aggregated block 1114, into appropriate memory pages for further processing.

An advantage of mechanisms disclosed herein is that a 4K block (e.g., aggregated block 1114) transmitted from the storage device 1102 to a host device can aggregate 64 I/O requests that are each 64 bytes into one 4K block (i.e., 64*64 bytes=4K). As a result, mechanisms disclosed herein can dramatically improve throughput and performance for read operations that are performed in conjunction with computational storage device 1102. Moreover, a plurality of FPGA core architectures can significantly enhance the performance of journal replay or any other data processing operations, during a read operation. Also, using a plurality of journals, similar to what was discussed with respect to FIGS. 8-10, allow for journal replays to efficiently aggregate 64 byte portions of data from 4K blocks 1108 to generate the aggregated block 1114.

Figure 12:
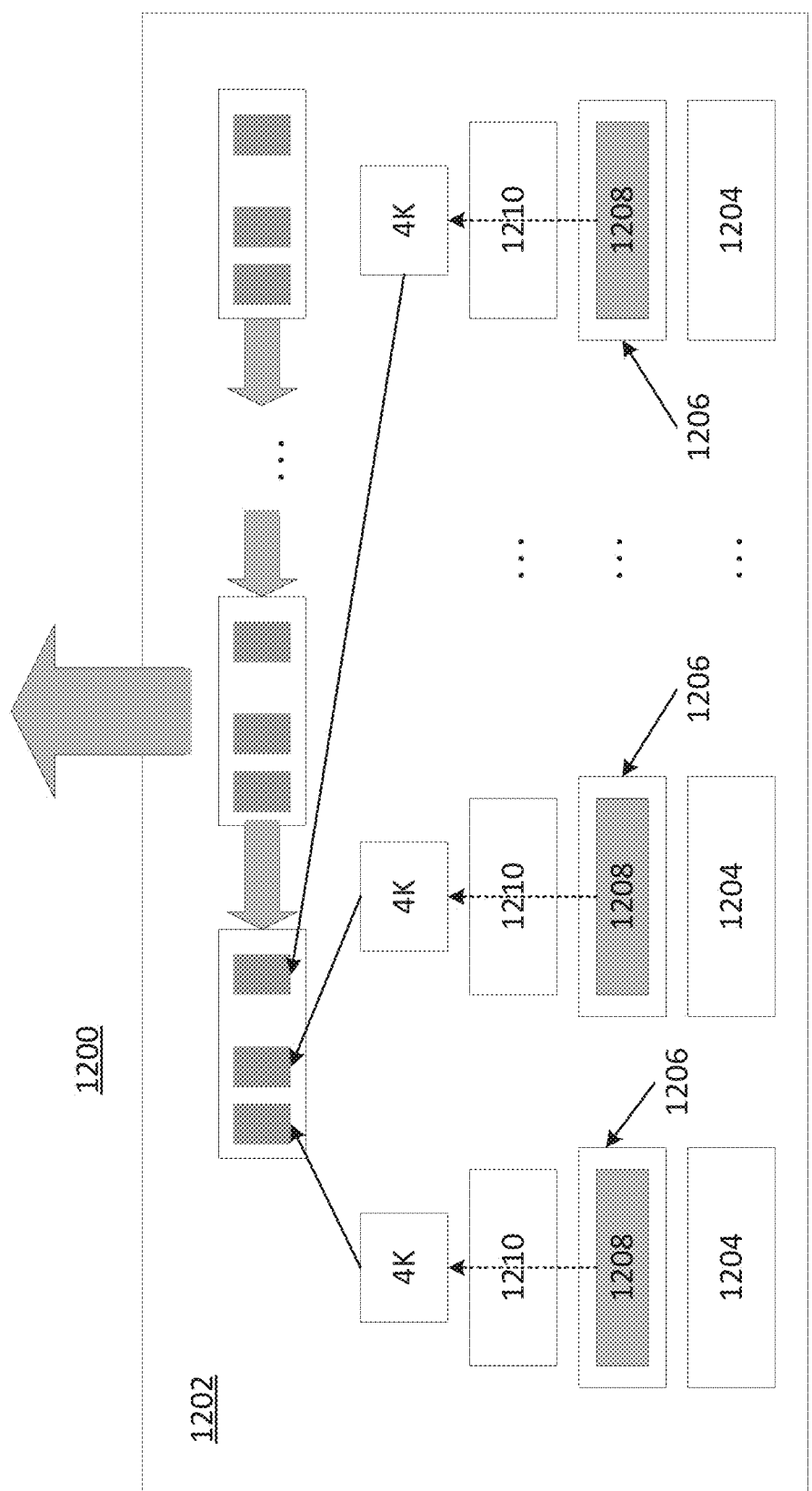
FIG. 12 illustrates a schematic diagram of a read path, using computational storage with hardware assistance, according to some aspects described herein.

FIG. 12 illustrates a schematic diagram 1200 of a read path, using computational storage with hardware assistance, according to some aspects described herein. The read path of schematic diagram 1200 may be similar to the read path of schematic diagram 1100, in some respects. The schematic diagram 1200 includes a computational storage device or storage device 1202. The storage device 1202 includes one or more NAND dies or dies 1204. The one or more NAND dies 1204 may have one or more zones 1206 that each have one or more journals 1208 stored therein. For example, the NAND dies 1204 may include LBAs, and at least a portion of the LBAs may be designated to store information corresponding to the one or more journals 1208, as discussed further below.

Generally, file systems may use a first set of (logical block addresses) LBAs to store, access, and or modify metadata and user data. However, the first set of LBAs may be encapsulated into metadata of transactions. Journal transactions may be stored into a second set of LBAs that storage devices expose to a host device. However, the second set of LBAs may not be the same as the first set of LBAs that are encapsulated into transactions. According to some examples of the present disclosure, systems disclosed herein can include flash translations layers (FTLs) that map LBAs into NAND flash pages. As a result, the flash translation layers can provide information regarding which NAND flash pages (e.g., of one or more NAND dies, such as NAND dies 1204) correspond to a desired LBA, such as an LBA that stores information corresponding to the one or more journals 1208.

Each NAND die 1204 and corresponding journal 1208 may have a corresponding FPGA core or core 1210. The core 1210 may be configured to extract data from the corresponding journal 1208. In some examples, the core 1210 may be configured to obtain data from the corresponding journal 1208. The core 1210 may replay journal 1208 and prepare a 4K block (e.g., aggregated from 64-byte data pieces), as described with respect to FIG. 11. The core 1210 may then transmit the aggregated 4K block (e.g., to a host device). Since there may be a plurality of cores 1210, 64 byte portions of 4K blocks (e.g., blocks 1108) may be efficiently aggregated into an aggregated 4K block (e.g., block 1114). The aggregated 4K block (e.g., block 1114) may be transmitted from the storage device 1202 (e.g., to a host device for further processing). The one or more NAND dies 1204 (including the one or more zones 1206, and the one or more journals 1208) and the one or more cores 1210 may, in combination, form a hardware architecture.

Figure 13:
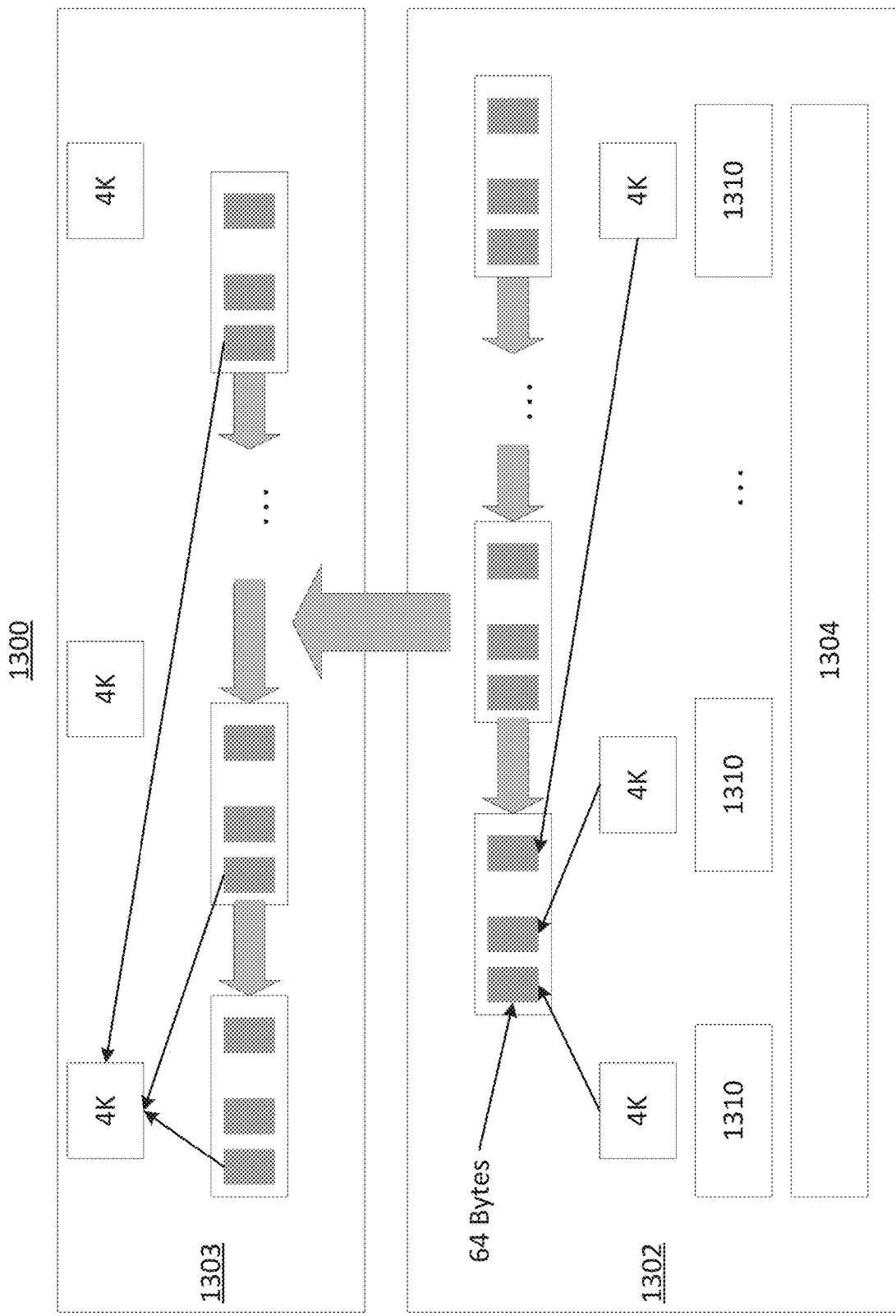
FIG. 13 illustrates a schematic diagram of a read path, using computational storage with hardware assistance, according to some aspects described herein.

FIG. 13 illustrates a schematic diagram 1300 of a read path, using computational storage with hardware assistance, according to some aspects described herein. The read path of schematic diagram 1300 may be similar to the read paths of schematic diagrams 1200 and 1100, in some respects. The schematic diagram 1300 includes a computational storage device 1302 and a host device 1303. The computational storage device 1302 includes persistent memory 1304. The persistent memory may be any kind of persistent memory recognized by those of ordinary skill in the art.

The computational storage device 1302 may further include one or more FPGA cores or cores 1310. The cores 1310 may be configured to extract or obtain data from the persistent memory 1304. The core 1310 may aggregate 64 byte portions of pages of 4K blocks into an aggregated 4K block, as described with respect to FIGS. 11 and 12. The core may then transmit the aggregated 4K block to the host device 1303, wherein the 4K block may be partitioned back into 64 byte segments that are each then stored in appropriate memory pages. Since there may be a plurality of cores 1310, 64 byte portions of the 4K blocks may be efficiently aggregated into an aggregated 4K block. The aggregated 4K block may be transmitted from the storage device 1302 to the host device 1303 for further processing. The persistent memory 1304 and the one or more cores 1310 may, in combination, form a hardware architecture.

Figure 14:
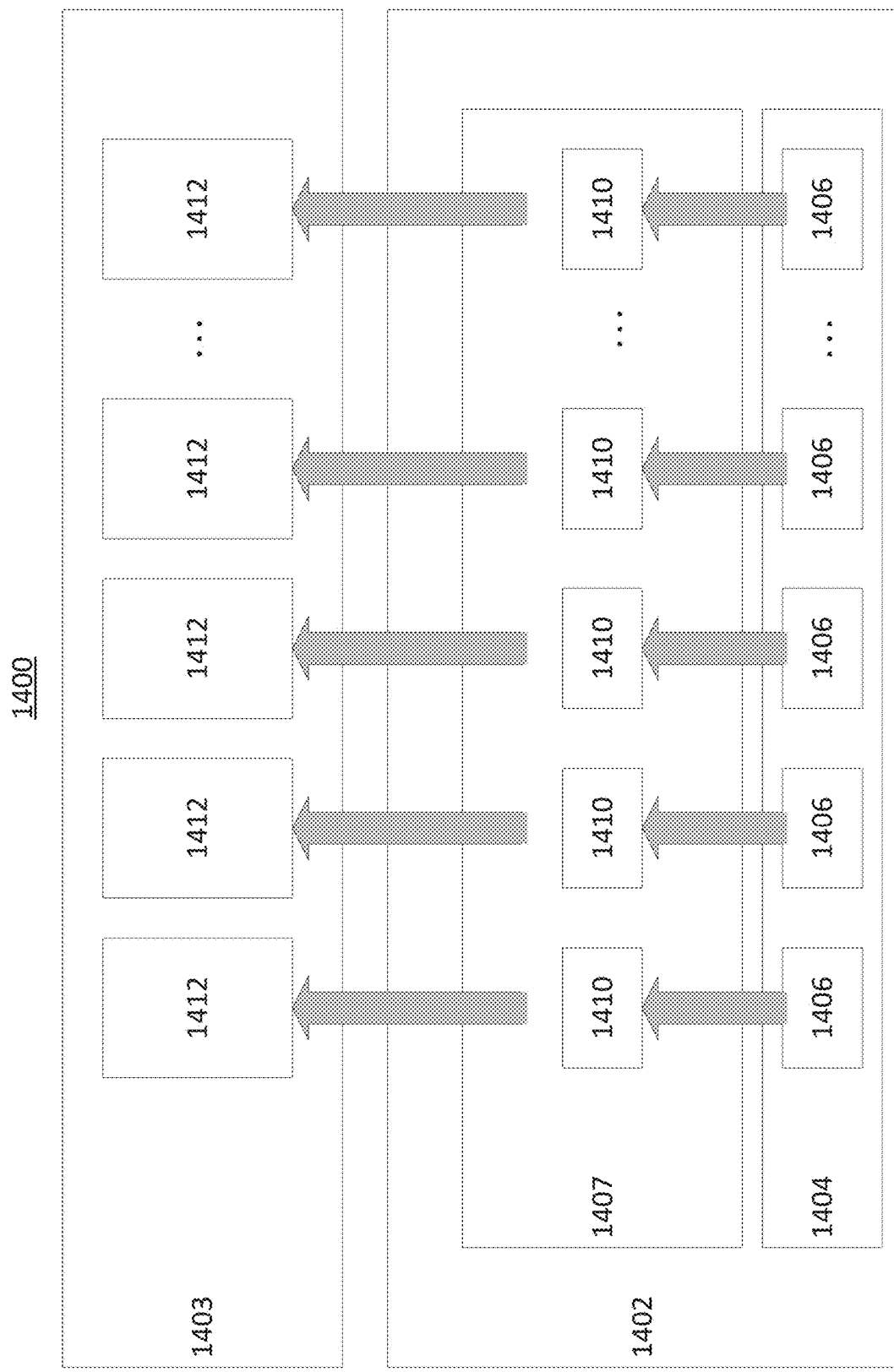
FIG. 14 illustrates a schematic diagram of a read path, using computational storage with hardware assistance, according to some aspects described herein.

FIG. 14 illustrates a schematic diagram 1400 of a read path, using computational storage with hardware assistance, according to some aspects described herein. The read path of schematic diagram 1400 may be similar to the read paths of schematic diagrams 1100-1300, in some respects. The schematic diagram 1400 includes a computational storage device 1402 and a host device 1403. The computational storage device 1402 includes a volume or memory 1404. The volume 1404 may include one or more journals 1406 stored therein. For example, the volume 1404 may have sections or LBAs that store data corresponding to the one or more journals 1406.

The storage device 1402 may further include a FPGA 1407 that includes cores 1410. The cores 1410 may be configured to receive data from the volume 1404. In some examples, the cores 1410 may be configured to obtain data from the volume 1404. The cores 1410 may aggregate 64 byte blocks into a 4K block, as described with respect to FIGS. 11-13. The core may then transmit the aggregated 4K blocks to the host device 1403, wherein the 4K blocks may be partitioned back into 64 byte segments that are each then stored in appropriate memory pages. Since there may be a plurality of cores 1410, there may be a plurality of aggregated 4K blocks that are generated. Each of the 4K blocks may be transmitted from the computational storage device 1402 to the host device 1403 for further processing. The volume 1404, the FPGA 1407, and the one or more cores 1410 may, in combination, form a hardware architecture.

The host device 1403 may receive data from the computational storage device 1402. For example, the host device may receive aggregated 4K blocks of data that can be portioned into 64-byte blocks. The host device 1403 may include one or more threads 1412. The one or more threads 1412 may be part of a hardware architecture of the host device 1403. Additionally, or alternatively, the one or more threads 1412 may be software threads that are generated by, for example, a kernel-space (e.g., kernel-space 308) or a user-space (e.g., user space 306). The one or more threads 1412 may each receive data from a corresponding one of the one or more cores 1410 from the storage device 1402. The architecture of the schematic diagram 1400 allows for data to be processed in a parallel manner (e.g., via the plurality of cores 1410 and the plurality of threads 1412), thereby enhancing performance of data processing (e.g., allowing data to be processed relatively quickly, while efficiently allocating computing resources).

Figure 15:
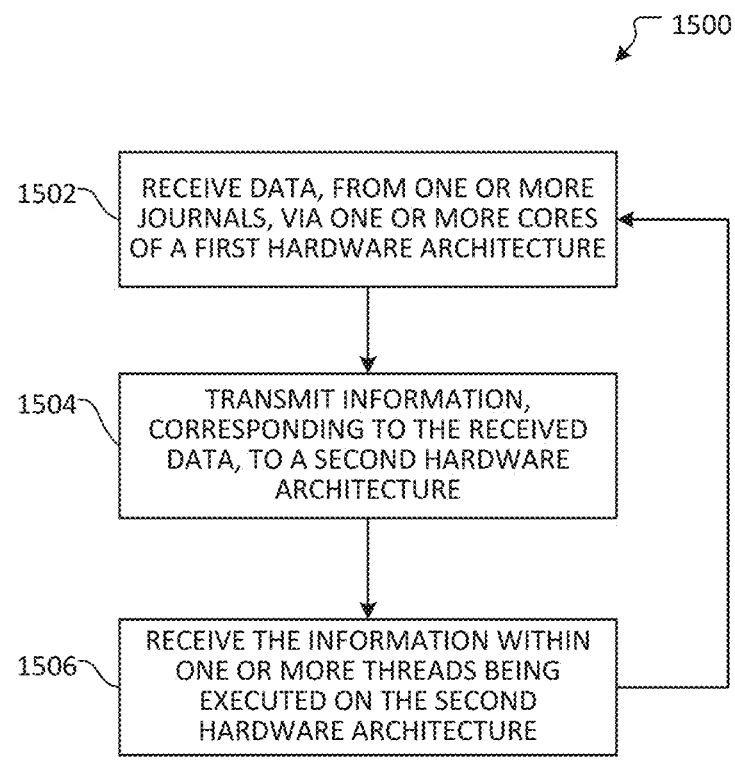
FIG. 15 illustrates a method of reading data from computational storage, according to some aspects described herein.

FIG. 15 illustrates a method 1500 of reading data from computational storage, according to some aspects described herein. In examples, aspects of method 1500 are performed by a system, such as system 100, 200, 230, 260, 300, 400, or 500, discussed earlier herein with respect to FIGS. 1-5.

Method 1500 begins at operation 1502, wherein data from one or more journals are received, via one or more cores of a first hardware architecture. For example, the first hardware architecture may correspond to one or more aspects of a computational storage device (e.g., the computation storage device of systems 100, 200, 230, 260, 300, 400, or 500). The one or more journals may be stored in persistent memory, a volume of memory, or partitioned zones or zones of memory, as discussed, for example, with respect to schematic diagrams 1100-1400. The first hardware architecture can include one of a field programmable gate array (FPGA), an infrastructure processing unit (IPU), a central processing unit (CPU), and a smart network interface controller (smartNIC). The first hardware architecture can further include non-volatile memory or persistent memory (e.g., flash memory) with instructions stored therein. The first hardware architecture can further include a plurality of cores, such as FPGA cores.

Flow progresses to operation 1504, wherein one or more computations are performed within the first hardware architecture. For example, one or more FPGA cores of the first hardware architecture may perform data transformation computations (e.g., arithmetic computations, Boolean functions, logic function, interference function, etc.) on data stored in persistent memory of the first hardware architecture. Additionally, or alternatively, the FPGA cores may perform journal replay operations.

Flow progresses to operation 1506, wherein information corresponding to the received data from operation 1502, and the one or more computations from operation 1504, is transmitted to a second hardware architecture. In some examples, the first hardware architecture transmits the data from the one or more journals to the second hardware architecture. In some examples, the second hardware architecture obtains the data from the first hardware architecture.

The second hardware architecture may correspond to one or more aspects of a host device (e.g., the host device of systems 100, 200, 230, 260, 300, 400, or 500). The second hardware architecture can include one of a field programmable gate array (FPGA), an infrastructure processing unit (IPU), a central processing unit (CPU), and a graphical processing unit (GPU). As described with respect to schematic diagrams 1100-1400.

Flows progresses to operation 1508, wherein the information transmitted from operation 1506 is received within one or more threads (e.g., threads 1412) being executed on the second hardware architecture. The one or more threads may be part of the hardware architecture of the host device. Additionally, or alternatively, the one or more threads may be software threads that are generated by, for example, a kernel-space or a user-space that are being executed on the second hardware architecture. The one or more threads may each receive data from a corresponding one of one or more cores of the first hardware architecture (e.g., cores of a storage device).

Figure 16:
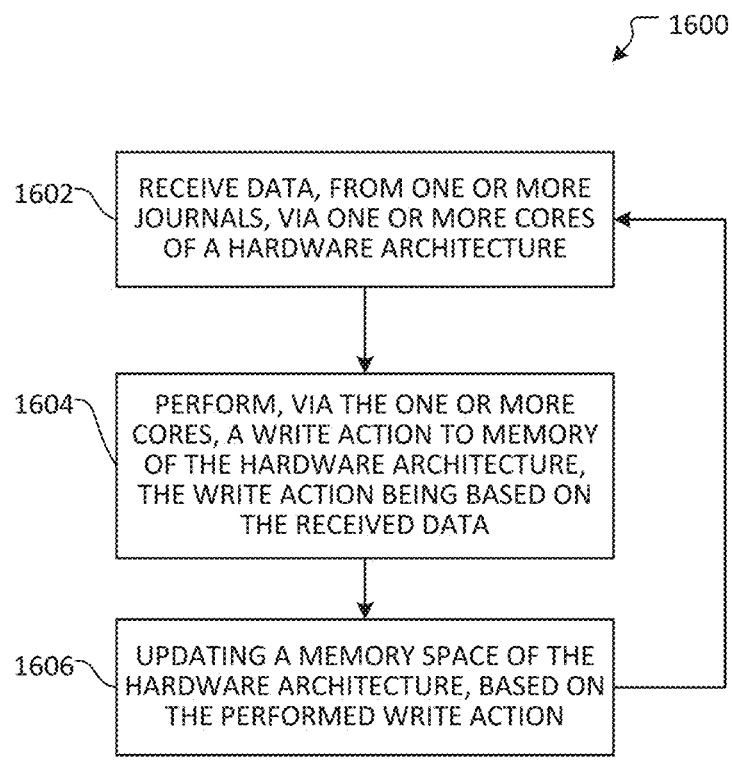
FIG. 16 illustrates a method of writing data to computational storage, according to some aspects described herein.

FIG. 16 illustrates a method of writing data to computational storage, according to some aspects described herein. In examples, aspects of method 1600 are performed by a system, such as system 100, 200, 230, 260, 300, 400, or 500, discussed earlier herein with respect to FIGS. 1-5.

Method 1600 begins at operation 1602, wherein instructions from one or more journals are received, via one or more cores of a hardware architecture. For example, the hardware architecture may correspond to one or more aspects of a computational storage device (e.g., the computation storage device of systems 100, 200, 230, 260, 300, 400, or 500). The one or more journals may be stored in persistent memory, a volume of memory, or partitioned zones or zones of memory, as discussed, for example, with respect to schematic diagrams 1100-1400. The hardware architecture can include one of a field programmable gate array (FPGA), an infrastructure processing unit (IPU), a central processing unit (CPU), and a smart network interface controller (smartNIC). The hardware architecture can further include non-volatile memory or persistent memory (e.g., flash memory) with instructions stored therein. The one or more cores can be a plurality of cores, such as FPGA cores.

Flow progresses to operation 1604, wherein one or more computations to manipulate data within memory of the hardware architecture are performed, via the one or more cores, the one or more computations being based on the received instructions from operation 1602. For example, the computation may be a journal replay, as described earlier herein, wherein memory of the hardware architecture is updated to a state based on transaction data stored in one or more journals. Additionally, or alternatively, one or more FPGA cores of the hardware architecture may perform data manipulation or transformation computations (e.g., arithmetic computations, Boolean functions, logic function, interference function, etc.) on data stored in persistent memory of the hardware architecture. In this respect, hardware architectures (e.g., computational storage devices) of the present disclosure can do more than simple write operations, the hardware architectures can do write operations, as well as computations (e.g., data transformation) during and/or after the write operations.

Flow progresses to operation 1606, wherein a memory space of the hardware architecture is updated, based on the performed write action. The memory space of the hardware architecture may be non-volatile memory or persistent memory (e.g., flash memory), persistent memory, a file system volume, or any other type of memory disclosed herein with regard to a computational storage device, or any other types of memory recognized by those of ordinary skill in the art, which may be applicable. The data received from the one or more journals at operation 1602 may be formatting instructions for one or more sets of data. The write action performed by the one or more cores may include performing read and write commands to format data, based on the formatting instructions received at operation 1602. Accordingly, the memory space of the hardware architecture may be updated, according to the formatting instructions, to organize the memory space (e.g., LBAs) according to the instructions received from the one or more journals.

Figure 17:
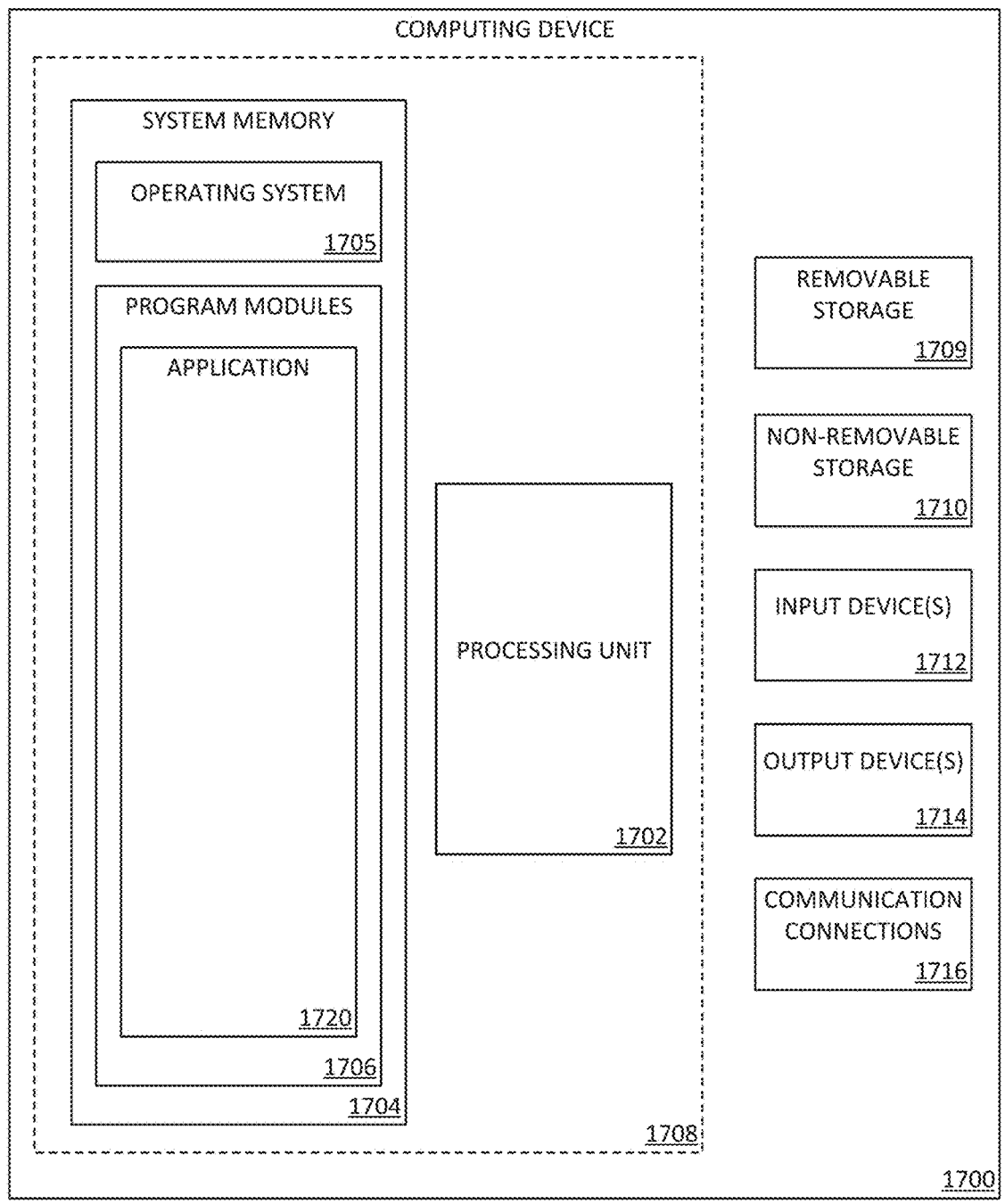
FIG. 17 is a block diagram illustrating physical components of a computing device with which aspects of the disclosure may be practiced.
Figure 18A:
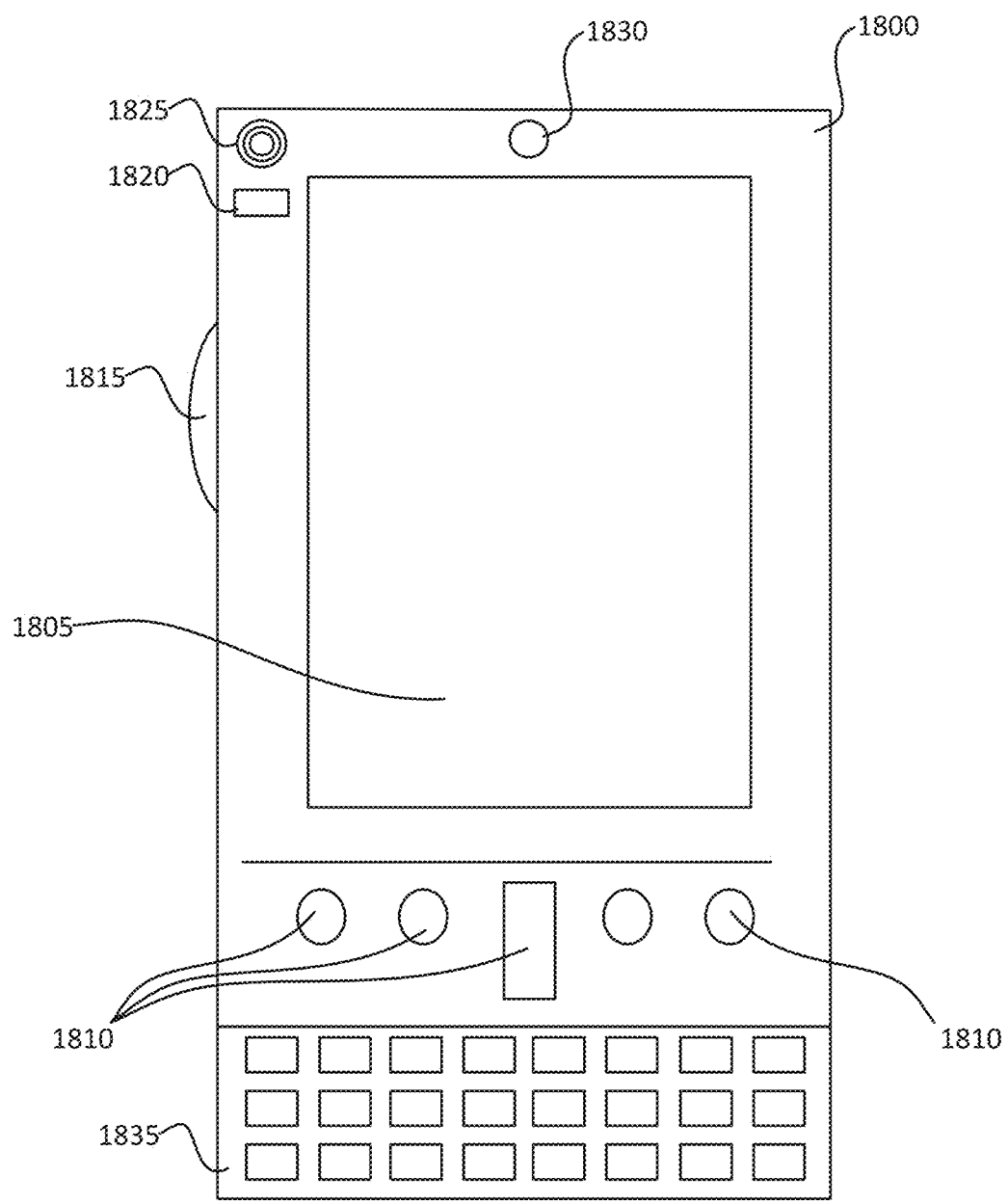
FIG. 18A illustrates a mobile computing device with which embodiments of the disclosure may be practiced.
Figure 18B:
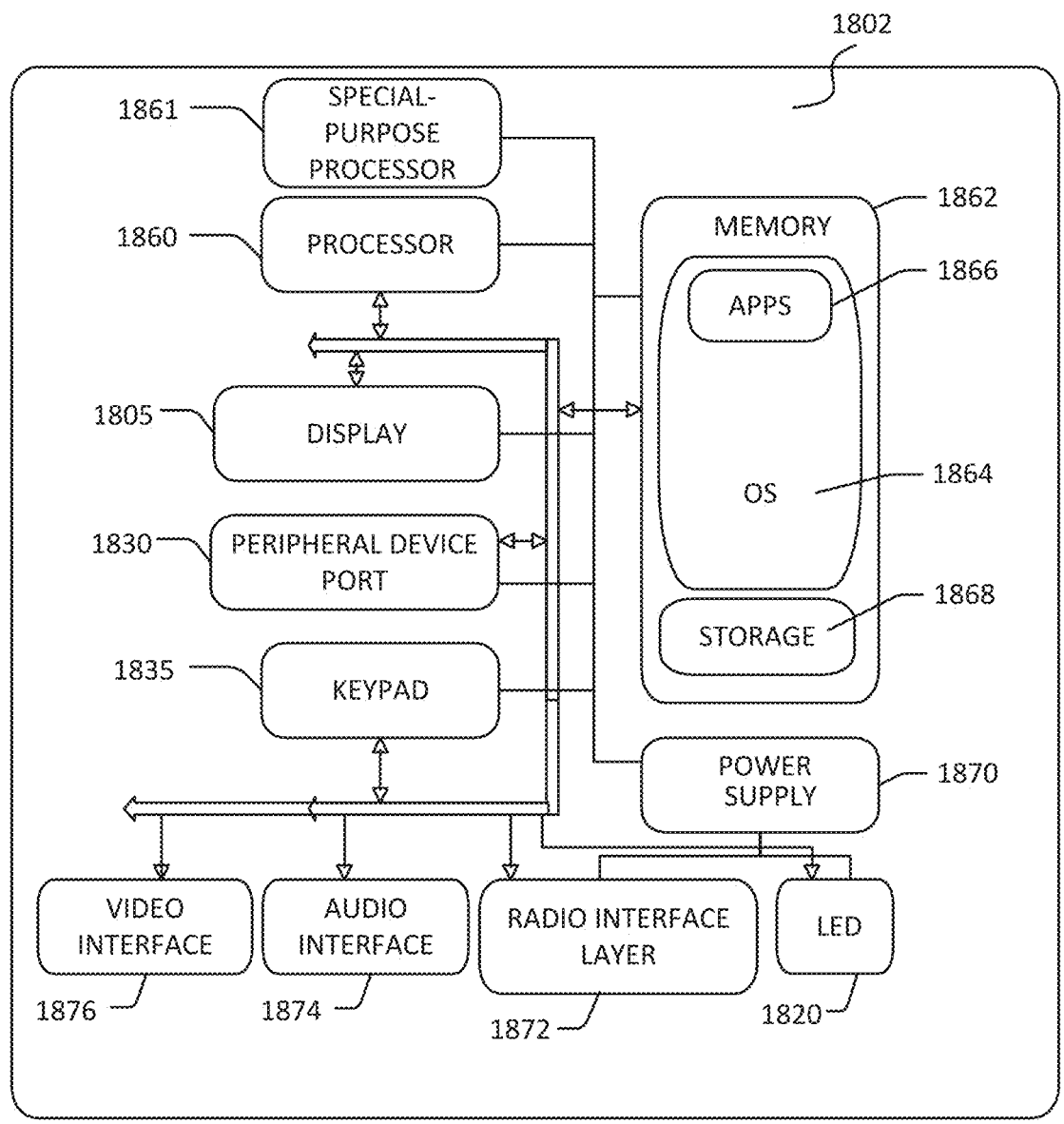
FIG. 18B is a block diagram illustrate the architecture of one aspect of a mobile computing device.
Figure 19:
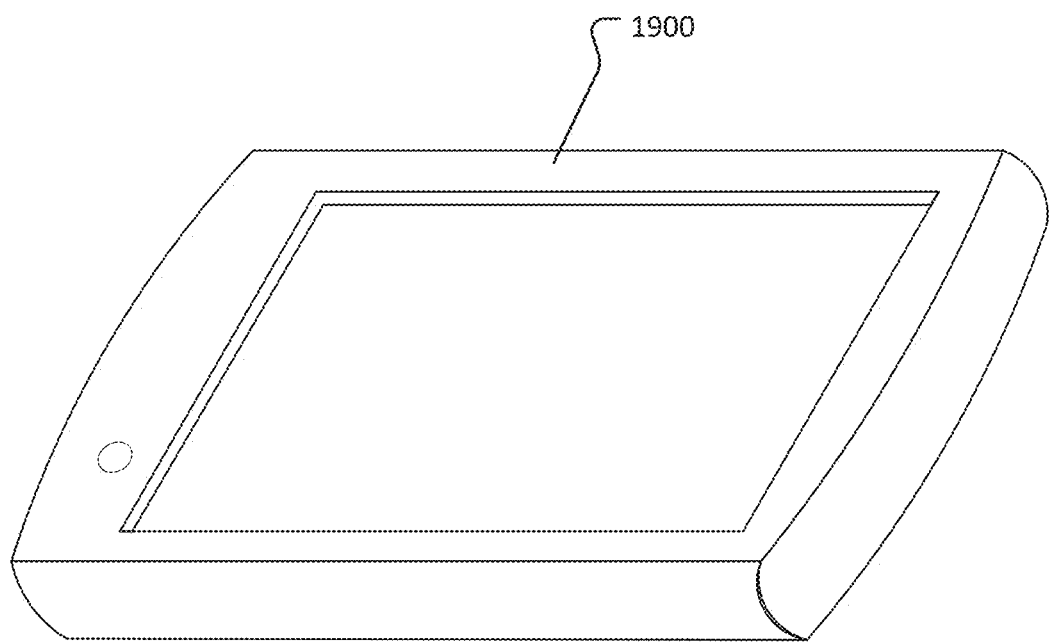
FIG. 19 illustrates an exemplary tablet computing device that may execute one or more aspects disclosed herein.

FIG. 17-19 and the associated descriptions provide a discussion of a variety of operating environments in which aspects of the disclosure may be practiced. However, the devices and systems illustrated and discussed with respect to FIGS. 17-19 are for purposes of example and illustration and are not limiting of a vast number of computing device configurations that may be utilized for practicing aspects of the disclosure, described herein.

FIG. 17 is a block diagram illustrating physical components (e.g., hardware) of a computing device 1700 with which aspects of the disclosure may be practiced. The computing device components described below may be suitable for the computing devices described above, including host devices and file systems 102, 202, 232, 262, 302, 402, 702, 1202, 1303, and 1402 discussed with respect to FIGS. 1-14. In a basic configuration, the computing device 1700 may include at least one processing unit 1702 and a system memory 1704. Depending on the configuration and type of computing device, the system memory 1704 may comprise, but is not limited to, volatile storage (e.g., random access memory), non-volatile storage (e.g., read-only memory), flash memory, or any combination of such memories.

The system memory 1704 may include an operating system 1705 and one or more program modules 1706 suitable for running software application 1720, such as one or more components supported by the systems described herein. The operating system 1705, for example, may be suitable for controlling the operation of the computing device 3400.

Furthermore, embodiments of the disclosure may be practiced in conjunction with a graphics library, other operating systems, or any other application program and is not limited to any particular application or system. This basic configuration is illustrated in FIG. 17 by those components within a dashed line 1708. The computing device 1700 may have additional features or functionality. For example, the computing device 1700 may also include additional data storage devices (removable and/or non-removable) such as, for example, magnetic disks, optical disks, or tape. Such additional storage is illustrated in FIG. 17 by a removable storage device 1709 and a non-removable storage device 1710.

As stated above, a number of program modules and data files may be stored in the system memory 1704. While executing on the processing unit 1702, the program modules 1706 (e.g., application 1720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1700 may also have one or more input device(s) 1712 such as a keyboard, a mouse, a pen, a sound or voice input device, a touch or swipe input device, etc. The output device(s) 1714 such as a display, speakers, a printer, etc. may also be included. The aforementioned devices are examples and others may be used. The computing device 1700 may include one or more communication connections 1716 allowing communications with other computing devices 1750 or computational storage devices 1740. Examples of suitable communication connections 1716 include, but are not limited to, radio frequency (RF) transmitter, receiver, and/or transceiver circuitry; universal serial bus (USB), parallel, and/or serial ports. The computational storage devices 1740 may be similar to the computational storage devices 104, 204, 234, 264, 304, 404, 504, 1102, 1202, 1302, and 1402 discussed with respect to FIGS. 1-14.

The term computer readable media as used herein may include computer storage media. Computer storage media may include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. Any such computer storage media may be part of the computing device 1700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 18A and 18B illustrate a mobile computing device 1800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 18A, one aspect of a mobile computing device 1800 for implementing the aspects is illustrated. In a basic configuration, the mobile computing device 1800 is a handheld computer having both input elements and output elements. The mobile computing device 1800 typically includes a display 1805 and one or more input buttons 1810 that allow the user to enter information into the mobile computing device 1800. The display 1805 of the mobile computing device 1800 may also function as an input device (e.g., a touch screen display).

If included, an optional side input element 1815 allows further user input. The side input element 1815 may be a rotary switch, a button, or any other type of manual input element. In alternative aspects, mobile computing device 1800 may incorporate more or less input elements. For example, the display 1805 may not be a touch screen in some embodiments.

In yet another alternative embodiment, the mobile computing device 1800 is a portable phone system, such as a cellular phone. The mobile computing device 1800 may also include an optional keypad 1835. Optional keypad 1835 may be a physical keypad or a "soft" keypad generated on the touch screen display.

In various embodiments, the output elements include the display 1805 for showing a graphical user interface (GUI), a visual indicator 1820 (e.g., a light emitting diode), and/or an audio transducer 1825 (e.g., a speaker). In some aspects, the mobile computing device 1800 incorporates a vibration transducer for providing the user with tactile feedback. In yet another aspect, the mobile computing device 1800 incorporates input and/or output ports, such as an audio input (e.g., a microphone jack), an audio output (e.g., a headphone jack), and a video output (e.g., a HDMI port) for sending signals to or receiving signals from an external device.

FIG. 18B is a block diagram illustrating the architecture of one aspect of a mobile computing device. That is, the mobile computing device 1800 can incorporate a system (e.g., an architecture) 1802 to implement some aspects. In one embodiment, the system 1802 is implemented as a "smart phone" capable of running one or more applications (e.g., browser, e-mail, calendaring, contact managers, messaging clients, games, and media clients/players). In some aspects, the system 1802 is integrated as a computing device, such as an integrated personal digital assistant (PDA) and wireless phone.

One or more application programs 1866 may be loaded into the memory 1862 and run on or in association with the operating system 1864. Examples of the application programs include phone dialer programs, e-mail programs, personal information management (PIM) programs, word processing programs, spreadsheet programs, Internet browser programs, messaging programs, and so forth. The system 1802 also includes a non-volatile storage area 1868 within the memory 1862. The non-volatile storage area 1868 may be used to store persistent information that should not be lost if the system 1802 is powered down. The application programs 1866 may use and store information in the non-volatile storage area 1868, such as e-mail or other messages used by an e-mail application, and the like. A synchronization application (not shown) also resides on the system 1802 and is programmed to interact with a corresponding synchronization application resident on a host computer to keep the information stored in the non-volatile storage area 1868 synchronized with corresponding information stored at the host computer. As should be appreciated, other applications may be loaded into the memory 1862 and run on the mobile computing device 1800 described herein (e.g., a signal identification component, a gaze tracker component, a shared computing component, etc.).

The system 1802 has a power supply 1870, which may be implemented as one or more batteries. The power supply 1870 might further include an external power source, such as an AC adapter or a powered docking cradle that supplements or recharges the batteries.

The system 1802 may also include a radio interface layer 1872 that performs the function of transmitting and receiving radio frequency communications. The radio interface layer 1872 facilitates wireless connectivity between the system 1802 and the "outside world," via a communications carrier or service provider. Transmissions to and from the radio interface layer 1872 are conducted under control of the operating system 1864. In other words, communications received by the radio interface layer 1872 may be disseminated to the application programs 1866 via the operating system 1864, and vice versa.

The visual indicator 1820 may be used to provide visual notifications, and/or an audio interface 1874 may be used for producing audible notifications via the audio transducer 1825. In the illustrated embodiment, the visual indicator 1820 is a light emitting diode (LED) and the audio transducer 1825 is a speaker. These devices may be directly coupled to the power supply 1870 so that when activated, they remain on for a duration dictated by the notification mechanism even though the processor 1860 and/or special-purpose processor 1861 and other components might shut down for conserving battery power. The LED may be programmed to remain on indefinitely until the user takes action to indicate the powered-on status of the device. The audio interface 1874 is used to provide audible signals to and receive audible signals from the user. For example, in addition to being coupled to the audio transducer 1825, the audio interface 1874 may also be coupled to a microphone to receive audible input, such as to facilitate a telephone conversation. In accordance with embodiments of the present disclosure, the microphone may also serve as an audio sensor to facilitate control of notifications, as will be described below. The system 1802 may further include a video interface 1876 that enables an operation of an on-board camera 1830 to record still images, video stream, and the like.

A mobile computing device 1800 implementing the system 1802 may have additional features or functionality. For example, the mobile computing device 1800 may also include additional data storage devices (removable and/or non-removable) such as, magnetic disks, optical disks, or tape. Such additional storage is illustrated in FIG. 18B by the non-volatile storage area 1868.

Data/information generated or captured by the mobile computing device 1800 and stored via the system 1802 may be stored locally on the mobile computing device 1800, as described above, or the data may be stored on any number of storage media that may be accessed by the device via the radio interface layer 1872 or via a wired connection between the mobile computing device 1800 and a separate computing device associated with the mobile computing device 1800, for example, a server computer in a distributed computing network, such as the Internet. As should be appreciated such data/information may be accessed via the mobile computing device 1800 via the radio interface layer 1872 or via a distributed computing network. Similarly, such data/information may be readily transferred between computing devices for storage and use according to well-known data/information transfer and storage means, including electronic mail and collaborative data/information sharing systems.

FIG. 19 illustrates an exemplary tablet computing device 1900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In accordance with at least one example of the present disclosure, a system is described. The system may include a first hardware architecture and computational storage. In examples, the computational storage includes a second hardware architecture and memory storing instructions that, when executed by the second hardware architecture, causes the system to perform a first set of operations. The first set of operation may include receiving instructions from the first hardware architecture, performing one or more computations on data stored in the second hardware architecture, based on the received instructions; and transmitting a result to the first hardware architecture, the result being based on the one or more performed computations.

In accordance with at least one aspect of the above example, the second hardware architecture comprises one of a field programmable gate array (FPGA), an infrastructure processing unit (IPU), a central processing unit (CPU), and a smart network interface controller (smartNIC).

In accordance with at least one aspect of the above example, the second hardware architecture includes at least one of an SSD or SMR drive comprising nonvolatile memory including the instructions stored therein.

In accordance with at least one aspect of the above example, the first hardware architecture comprises one of a field programmable gate array (FPGA), an infrastructure processing unit (IPU), a central processing unit (CPU), and a graphics processing unit (GPU).

In accordance with at least one aspect of the above example, the second hardware architecture comprises at least one journal stored in memory thereof, and the second hardware architecture further comprises at least one core, and at least one die, wherein the at least one core receives journal instructions from the at least one journal, and wherein the at least one die receives data from the at least one core, the data corresponding to the journal instructions.

In accordance with at least one aspect of the above example, the at least one die comprises a plurality of zones, and wherein a different one of the at least one cores is assigned to send and receive data from each of the plurality of zones, each of the at least one cores being configured to perform computations on the data received from the plurality of zones.

In accordance with at least one aspect of the above example, the first hardware architecture comprises at least one thread, and the second hardware architecture comprises at least one core, and the second hardware architecture comprises at least one journal stored in memory thereof, wherein the at least one core receives journal instructions from the at least one journal, and wherein the at least one thread receives data from the at least one core, the data corresponding to the journal instructions.

In accordance with at least one aspect of the above example, the second hardware architecture comprises a plurality of cores.

In accordance with at least one aspect of the above example, performing computations comprises reading one or more executable journal instructions from one or more journals, via the plurality of cores, the one or more journals being stored in memory of the computational storage, and executing one or more functions on the data stored in the second hardware architecture, based on the one or more executable journal instructions.

In accordance with at least one aspect of the above example, the one or more journals comprise a plurality of journals, wherein each of the plurality of cores are configured to read journal instructions from a corresponding one of the plurality journals, and wherein each of the plurality of cores execute one or more functions on the data stored in the second hardware architecture, based on the journal instructions from the plurality of journals.

In accordance with at least one aspect of the above example, the first hardware architecture comprises a plurality of threads, and each of the plurality of threads are configured to receive data from one or more of the plurality of cores, the data corresponding to the journal instructions.

In accordance with at least one example of the present disclosure, a method of reading data from computational storage is described. The method may include receiving data, from one or more journals, via one or more cores of a first hardware architecture, the received data corresponding to journal transactions; performing one or more computations, within the first hardware architecture; transmitting information, corresponding to the received data and the one or more performed computations, to a second hardware architecture; and receiving the information within one or more threads being executed on the second hardware architecture; wherein the one or more journals are stored in the first hardware architecture, the first hardware architecture including at least one of persistent memory, non-volatile memory, or storage class memory, implemented in a storage device.

In accordance with at least one aspect of the above example, the memory is NAND flash memory implemented in a solid-state drive.

In accordance with at least one aspect of the above example, the one or more journals are a plurality of journals, and the one or more cores are a plurality of cores that are each configured to receive data from a corresponding one of the plurality of journals.

In accordance with at least one aspect of the above example, the one or more computations are one of arithmetic, logical, or interference computations.

In accordance with at least one aspect of the above example, the first hardware architecture comprises one of a field programmable gate array (FPGA), an infrastructure processing unit (IPU), a central processing unit (CPU), and a smart network interface controller (smartNIC).

In accordance with at least one example of the present disclosure, a method of performing a computation on a computational storage device is described. The method may include receiving instructions at one or more cores of a hardware architecture; performing, via the one or more cores, one or more computations to manipulate data within memory of the hardware architecture, the one or more computations being based on the received instructions; and the memory is at least one of persistent memory, non-volatile memory, or storage class memory, implemented in a storage device.

In accordance with at least one aspect of the above example, the memory is NAND flash memory implemented in a solid-state drive.

In accordance with at least one aspect of the above example, the instructions are based on transactions of one or more journals that are stored in persistent memory of the hardware architecture.

In accordance with at least one aspect of the above example, the the one or more journals are a plurality of journals, and wherein the one or more cores are a plurality of cores that are each configured to perform computations based on transactions of one or more of the plurality of journals.

In accordance with at least one aspect of the above example, the one or more computations are one of arithmetic, logical, or interference computations.

In accordance with at least one aspect of the above example, the hardware architecture comprises one of a field programmable gate array (FPGA), an infrastructure processing unit (IPU), a central processing unit (CPU), and a smart network interface controller (smartNIC).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of reading data from computational storage, the method comprising:
    receiving first data, from one or more journals, via one or more cores of a first hardware architecture, the received first data corresponding to journal transactions;
    performing one or more computations, within the first hardware architecture, the one or more computations being performed on second data, and the second data already being stored in the first hardware architecture when the first data is received;
    transmitting information, corresponding to the received first data and the one or more performed computations, to a second hardware architecture; and
    receiving the information within one or more threads being executed on the second hardware architecture;
    wherein the one or more journals are stored in the first hardware architecture, the first hardware architecture including at least one of persistent memory, non-volatile memory, or storage class memory, implemented in a storage device.

2. The method of claim 1, wherein the one or more journals are a plurality of journals, and wherein the one or more cores are a plurality of cores that are each configured to receive data from a corresponding one of the plurality of journals.

3. The method of claim 2, wherein the one or more computations are one of arithmetic, logical, or interference computations.

4. The method of claim 1, wherein the memory is NAND flash memory implemented in a solid-state drive.

5. A method of performing a computation on a computational storage device, the method comprising:
    receiving instructions, from one or more journals, at one or more cores of a hardware architecture implemented in the computational storage device;
    performing, via the one or more cores, one or more computations to manipulate data within memory of the hardware architecture, the one or more computations being based on the received instructions, and the one or more computations being performed on data already stored in the memory of the hardware architecture when the instructions are received; and
    wherein the memory is at least one of persistent memory, non-volatile memory, or storage class memory, implemented in a storage device.

6. The method of claim 5, wherein the memory is NAND flash memory implemented in a solid-state drive.

7. The method of claim 5, wherein the instructions are based on transactions of the one or more journals that are stored in persistent memory of the hardware architecture.

8. The method of claim 7, wherein the one or more computations are one of arithmetic, logical, or interference computations.

9. The method of claim 8, wherein the hardware architecture comprises one of a field programmable gate array (FPGA), an infrastructure processing unit (IPU), a central processing unit (CPU), and a smart network interface controller (smartNIC).

10. A system comprising:
    a first hardware architecture; and
    computational storage, the computational storage comprising:
        a second hardware architecture; and
        memory storing instructions that, when executed by the second hardware architecture, causes the system to perform a set of operations, the set of operations comprising:
            receiving first data, from one or more journals, via one or more cores of the second hardware architecture, the received first data corresponding to journal transactions;
            performing one or more computations, within the second hardware architecture, the one or more computations being performed on second data, and the second data already being stored in the second hardware architecture when the first data is received;

transmitting information, corresponding to the received first data and the one or more performed computations, to the first hardware architecture; and receiving the information within one or more threads being executed on the first hardware architecture, wherein the one or more journals are stored in the second hardware architecture, the second hardware architecture including at least one of persistent memory, non-volatile memory, or storage class memory, implemented in a storage device.

11. The system of claim 10, wherein the one or more journals are a plurality of journals, and wherein the one or more cores are a plurality of cores that are each configured to receive data from a corresponding one of the plurality of journals.

12. The system of claim 11, wherein the one or more computations are one of arithmetic, logical, or interference computations.

13. The system of claim 10, wherein the memory is NAND flash memory implemented in a solid-state drive.

14. The system of claim 10, wherein the second hardware architecture comprises one of a field programmable gate array (FPGA), an infrastructure processing unit (IPU), a central processing unit (CPU), and a smart network interface controller (smartNIC).

15. The system of claim 10, wherein the memory is nonvolatile memory, and wherein the second hardware architecture includes at least one of a solid-state drive (SSD) or shingled magnetic recording (SMR) drive comprising the nonvolatile memory including the instructions stored therein.

16. The system of claim 10, wherein the first hardware architecture comprises one of a field programmable gate array (FPGA), an infrastructure processing unit (IPU), a central processing unit (CPU), and a graphics processing unit (GPU).

* * * * *